(12) United States Patent
Umeda

(10) Patent No.: US 12,001,104 B2
(45) Date of Patent: Jun. 4, 2024

(54) LIQUID CRYSTAL DISPLAY DEVICE

(71) Applicant: TRIVALE TECHNOLOGIES, LLC, Santa Clara, CA (US)

(72) Inventor: Hiroshi Umeda, Kumamoto (JP)

(73) Assignee: TRIVALE TECHNOLOGIES, LLC, Santa Clara, CA (US)

( * ) Notice: Subject to any disclaimer, the term of this patent is extended or adjusted under 35 U.S.C. 154(b) by 0 days.

(21) Appl. No.: 18/003,826

(22) PCT Filed: Jun. 30, 2021

(86) PCT No.: PCT/JP2021/024792
§ 371 (c)(1),
(2) Date: Dec. 29, 2022

(87) PCT Pub. No.: WO2022/004799
PCT Pub. Date: Jan. 6, 2022

(65) Prior Publication Data
US 2023/0258985 A1 Aug. 17, 2023

(30) Foreign Application Priority Data

Jun. 30, 2020 (JP) .................................. 2020-112973
Jun. 25, 2021 (JP) .................................. 2021-106141

(51) Int. Cl.
*G02F 1/1339* (2006.01)
(52) U.S. Cl.
CPC ................................ *G02F 1/13396* (2021.01)
(58) Field of Classification Search
CPC .................................................... G02F 1/1339
See application file for complete search history.

(56) References Cited

U.S. PATENT DOCUMENTS

2019/0265824 A1* 8/2019 Abe ...................... G06F 3/0446

FOREIGN PATENT DOCUMENTS

JP   H09-069129 A    3/1997
JP   2000-322650 A   11/2000
(Continued)

OTHER PUBLICATIONS

International Search Report issued in PCT/JP2021/024792; dated Aug. 31, 2021.

*Primary Examiner* — Sang V Nguyen
(74) *Attorney, Agent, or Firm* — Studebaker & Brackett PC

(57) ABSTRACT

This liquid crystal display device has a first substrate, a second substrate, a liquid crystal layer sandwiched between the first and second substrates, a seal, and a spacer. The seal includes: a first seal part having a linear shape in a first direction; a second seal part having a linear shape in a second direction; and a third seal part having a curved shape that smoothly connects the first seal part and the second seal part. When a second region is a region surrounded by the outer periphery of a first region for displaying an image, the third seal part, a first normal line that extends downward from the boundary point between the first seal part and the third seal part to the outer periphery of the first region, and a second normal line that extends downward from the boundary point between the second seal part and the third seal part to the outer periphery of the first region, and a third region is a region other than the first region and the second region, the spacer arrangement density is greater in the second region than in the third region.

20 Claims, 16 Drawing Sheets

(56) References Cited

FOREIGN PATENT DOCUMENTS

| | | | | | |
|---|---|---|---|---|---|
| JP | 2002-328382 | A | 11/2002 | | |
| JP | 2006-236032 | A | 9/2006 | | |
| JP | 2009-093438 | A | 4/2009 | | |
| JP | 2009-199241 | A | 9/2009 | | |
| JP | 2010-210832 | A | 9/2010 | | |
| JP | 2010210832 | * | 9/2010 | ........... | G02F 1/1339 |
| JP | 2014-035428 | A | 2/2014 | | |
| JP | 2019-152930 | A | 9/2019 | | |
| JP | 6625310 | B1 | 12/2019 | | |
| KR | 10-2007-0051415 | A | 5/2007 | | |
| KR | 20070051415 | * | 5/2007 | ........... | G02F 1/1345 |

* cited by examiner

LIQUID CRYSTAL DISPLAY DEVICE

TECHNICAL FIELD

The present disclosure relates to a free-form liquid crystal display device having notches in an outer peripheral shape thereof. The present disclosure furthermore relates to a non-rectangular liquid crystal display device having cutouts in an outer peripheral shape thereof.

BACKGROUND ART

A liquid crystal display device comprises a liquid crystal panel in which an array substrate having a TFT (thin film transistor) and electrodes, and a color filter substrate having a colorant and a black matrix are bonded together with a liquid crystal layer interposed, and a backlight constituting a light source. In the liquid crystal panel, a gap between the array substrate and the color filter substrate is referred to as a cell gap which corresponds to the thickness of the liquid crystal layer, and variations in the cell gap have a considerable influence on transmittance of the liquid crystal layer. Unevenness in the cell gap (referred to below as "gap unevenness") within a display region for displaying an image therefore causes problems of display unevenness. To deal with this, spacers which are interposed between the two substrates are arranged in the liquid crystal layer to keep the cell gap in a fixed range. Furthermore, a seal which is formed between the two substrates so as to surround the liquid crystal layer also has the role of maintaining the cell gap, in addition to the role of sealing the liquid crystals.

Columnar spacers which are formed by pattern exposure on a surface of the color filter substrate touching the liquid crystals are sometimes used as the spacers. During a normal situation without any external factors such as external force or temperature change, the columnar spacers are interposed between the array substrate and the color filter substrate and are in a deformed state so as to be somewhat flattened, with the elastic force thereof keeping the cell gap in a fixed range. However, if the elastic force of the columnar spacers is too strong, the columnar spacers can no longer follow the shape of the liquid crystals when the liquid crystals contract under a low-temperature environment, which makes problems such as low-temperature bubbling more likely to occur, where air bubbles form within the liquid crystals. Furthermore, if the elastic force of the columnar spacers is too weak, the cell gap increases beyond the height of the columnar spacers when the liquid crystals expand under a high-temperature environment, and the liquid crystals collect in a lower portion of the liquid crystal panel when the panel is installed upright, which makes the problem of bulging at the bottom more likely under high temperatures.

In order to deal with these problems, it is possible to use a dual spacer structure formed with two types of columnar spacers having different heights. In the dual spacer structure, during a normal situation without any external factors such as external force or temperature change, main spacers having a greater height contact the array substrate and the color filter substrate so as to have the function of maintaining the cell gap, while sub-spacers having a smaller height do not contact the array substrate and do not function as spacers. However, when the cell gap decreases due to external factors such as external force and temperature change, the sub-spacers also contact the array substrate so as to function as spacers, restricting any further reduction in the cell gap. The combined use of the sub-spacers has a further advantage in making it easier to set the elastic force of the main spacers more appropriately.

Meanwhile, liquid crystal display devices having a non-rectangular shape, which are known as free-form displays, have become more widespread in recent years. Free-form displays have various applications, such as in automotive meter panels and cellular telephones, and these have also become a focus from the point of view of functionality and design. However, when a free-form display has cutout-shaped indents called notches in the outer peripheral shape thereof in particular, internal stress in members including glass substrates and polarizing plates is likely to concentrate in those notches, and, as a result, there are localized variations in the cell gap around the notches, leading to gap unevenness, and this causes a problem of display unevenness.

That is to say, liquid crystal display devices having a non-rectangular display (also referred to as a free-form display), rather than a rectangular external shape, have become more widespread in recent years. Non-rectangular displays have various applications, such as in automotive meter panels and cellular telephones, and these have also become a focus from the point of view of functionality and design. However, when a free-form display has cutouts in the outer peripheral shape thereof, internal stress in members including glass substrates and polarizing plates is likely to concentrate near the corners of the cutouts, and, as a result, there are localized variations in the cell gap around the cutouts, leading to gap unevenness, and this causes a problem of display unevenness.

In order to deal with this gap unevenness, Patent Document 1 describes a liquid crystal panel for a curved free-form display having a non-rectangular planar shape including notches, wherein a spacer arrangement density per unit surface area increases toward the outside in a concentric manner centered on a point where the outer peripheral shape of the display region changes. Here, the spacer arrangement density denotes the sum of surface areas, in a plan view, of the columnar spacers which are provided per unit surface area of a substrate surface, i.e., the areal density.

Furthermore, Patent Document 2 describes a rectangular liquid crystal panel having a liquid crystal injection process, wherein the columnar spacer arrangement density is increased at corner angled portions on the opposite side to an injection port, or the elastic force of the spacers is increased by employing bank-shaped spacers.

Furthermore, Patent Document 3 describes a rectangular liquid crystal panel wherein dummy seals are formed only at positions in proximity to corner angled portions, affording only a spacer function without having a function for sealing the liquid crystals.

That is to say, in order to deal with this gap unevenness, Patent Document 1 describes a liquid crystal panel for a curved free-form display having a non-rectangular planar shape including cutouts, wherein a spacer arrangement density per unit surface area increases toward the outside in a concentric manner centered on a point where the outer peripheral shape of the display region changes. Here, the spacer arrangement density denotes the sum of surface areas, in a plan view, of the columnar spacers which are provided per unit surface area of a substrate surface, i.e., the areal density.

Furthermore, Patent Document 2 describes a rectangular liquid crystal panel having a liquid crystal injection process, wherein the columnar spacer arrangement density is higher at corner angled portions on the opposite side to an injection port, or the elastic force of the spacers is increased by employing bank-shaped spacers.

Furthermore, Patent Document 3 describes a rectangular liquid crystal panel wherein dummy seals are formed only at positions in proximity to the corners, affording only a spacer function without having a function for sealing the liquid crystals.

PRIOR ART DOCUMENTS

Patent Documents

Patent Document 1: JP 6625310 B1
Patent Document 2: JP 2014-35428 A
Patent Document 3: JP 2002-328382 A

SUMMARY OF THE INVENTION

Problems to be Solved by the Invention

However, the technology disclosed in Patent Document 1 is based on a curved free-form display, and since the spacer arrangement density at the notches is reduced, it is not possible to restrict display unevenness at the notches. Furthermore, the strength against external pressure is reduced because of the lower sub-spacer arrangement density, which produces unevenness. Furthermore, the technology disclosed in Patent Documents 2 and 3 does not relate to a free-form display, and there is no description relating to notches.

That is to say, the technology disclosed in Patent Document 1 is based on a curved non-rectangular display, and since the spacer arrangement density at the cutouts is reduced, it is not possible to restrict display unevenness at the cutouts. Furthermore, the strength against external pressure is reduced because of the lower sub-spacer arrangement density, which produces unevenness.

Furthermore, the technology disclosed in Patent Documents 2 and 3 does not relate to a non-rectangular display, and there is no description relating to cutouts.

Means for Solving the Problems

A liquid crystal display device according to the present disclosure is a liquid crystal display device comprising: a first substrate; a second substrate arranged facing the first substrate; a liquid crystal layer interposed between the first substrate and the second substrate; a seal which is arranged between the first substrate and the second substrate so as to surround the liquid crystal layer, the seal having a curved indent in an outer peripheral shape thereof; and first spacers which are provided on a surface of the first substrate facing the liquid crystal layer and maintain an interval between the first substrate and the second substrate, characterized in that, when: a region corresponding to the liquid crystal layer for displaying an image constitutes a first region, a region corresponding to the liquid crystal layer and surrounded by the curved indent of the seal, the outer periphery of the first region, a first normal line extending downward from a start point of the curved indent of the seal to the outer periphery of the first region, and a second normal line extending downward from an end point of the curved indent of the seal to the outer periphery of the first region constitutes a second region, and a region corresponding to the liquid crystal layer other than the first region and other than the second region constitutes a third region, in a plan view, a surface area occupied by the first spacers per unit surface area of the second region is greater than a surface area occupied by the first spacers per unit surface area of the third region.

Application Example 1

A liquid crystal display device according to the present disclosure comprises: a first substrate; a second substrate arranged facing the first substrate; a liquid crystal layer interposed between the first substrate and the second substrate; a seal which is arranged between the first substrate and the second substrate so as to surround the liquid crystal layer; and spacers which are provided between the first substrate and the second substrate and maintain an interval between the first substrate and the second substrate. In this liquid crystal display device, the seal includes: a first sealing portion extending in a first direction, a second sealing portion extending in a second direction different from the first direction, and a third sealing portion smoothly joining the first sealing portion and the second sealing portion. The first sealing portion and the second sealing portion have a linear shape, and the third sealing portion has a curved shape such as an arcuate shape. In a plan view of the liquid crystal display device, a region for displaying an image constitutes a first region (display region), a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and a region other than the first region and other than the second region constitutes a third region. When a spacer arrangement density is defined as a proportion of the surface area occupied by the spacers per unit surface area in a plan view, the spacer arrangement density in the liquid crystal display device of the present disclosure is greater in the second region than in the third region.

Moreover, the liquid crystal display device of the present disclosure is especially effective when an interior angle formed by the first direction and the second direction exceeds 180°. An interior angle is an inside angle formed by two straight lines, i.e., an angle on the center side of the display region.

Furthermore, in the present specification, the liquid crystal display device is configured by an array substrate and a color filter substrate, with the substrate on which the spacers are arranged during production constituting the first substrate, while the other substrate constitutes the second substrate.

In other words, the present invention provides a liquid crystal display device comprising: a first substrate; a second substrate arranged facing the first substrate; a liquid crystal layer interposed between the first substrate and the second substrate; a seal which is arranged between the first substrate and the second substrate so as to surround the liquid crystal layer, the seal having a curved indent in an outer peripheral shape thereof; and spacers which are provided on a surface of the first substrate facing the liquid crystal layer and maintain an interval between the first substrate and the second substrate, characterized in that, when: a region corresponding to the liquid crystal layer for displaying an image constitutes a first region, a region corresponding to the liquid crystal layer and surrounded by the curved indent of the seal, the outer periphery of the first region, a first normal line extending downward from a start point of the curved indent of the seal to the outer periphery of the first region, and a second normal line extending downward from an end point of the curved indent of the seal to the outer periphery of the first region constitutes a second region, and a region corresponding to the liquid crystal layer other than the first region and other than the second region constitutes a third region, in a plan view, a surface area occupied by the spacers per unit surface area of the second region is greater than a surface area occupied by the spacers per unit surface area of the third region.

Application Example 2

In the liquid crystal display device of the present disclosure, the spacer arrangement density in the second region may be uniform or non-uniform. When the spacer arrangement density is non-uniform, a liquid crystal display device as disclosed in Application
Example 1 is characterized in that the spacer arrangement density in the second region becomes smaller approaching the first normal line or the second normal line.

Application Example 3

Furthermore, a liquid crystal display device of the present disclosure, which is in accordance with the liquid crystal display device disclosed in Application Example 1 or 2, is characterized in that the spacer arrangement density in the third region is equal to or less than the minimum value of the spacer arrangement density in the second region. That is to say, the spacer arrangement density in the third region is the same as or smaller than the minimum value of the spacer arrangement density in the second region.

Application Example 4

Furthermore, a liquid crystal display device of the present disclosure, which is in accordance with the liquid crystal display device disclosed in any one of Application Examples 1 to 3, is characterized in that the spacer arrangement density in the third region is equal to or greater than the spacer arrangement density in the first region. That is to say, the spacer arrangement density in the third region is the same as or greater than the spacer arrangement density in the first region.

Application Example 5

Furthermore, a liquid crystal display device of the present disclosure, which is in accordance with the liquid crystal display device disclosed in any one of
Application Examples 1 to 4, is characterized in that the spacers include first spacers and second spacers having a smaller height than the first spacers.

Application Example 6

Furthermore, a liquid crystal display device of the present disclosure, which is in accordance with the liquid crystal display device disclosed in any one of Application Examples 1 to 3, is characterized in that the spacers in the second region are a dummy seal formed from the same material as the seal.

Application Example 7

A liquid crystal display device according to the present disclosure comprises: a first substrate; a second substrate arranged facing the first substrate; a liquid crystal layer interposed between the first substrate and the second substrate; a seal which is arranged between the first substrate and the second substrate so as to surround the liquid crystal layer; and spacers provided on a surface of the first substrate facing the liquid crystal layer. In this liquid crystal display device, the seal includes: a first sealing portion extending in a first direction, a second sealing portion extending in a second direction different from the first direction, and a third sealing portion smoothly joining the first sealing portion and the second sealing portion. The first sealing portion and the second sealing portion have a linear shape, and the third sealing portion has a curved shape such as an arcuate shape. In a plan view of the liquid crystal display device, a region for displaying an image constitutes a first region (display region), a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and a region other than the first region and other than the second region constitutes a third region. In the liquid crystal display device of the present disclosure, the height of at least one of the spacers in the second region is greater than the height of the spacers in the third region, before the second substrate is arranged facing the first substrate. Moreover, the liquid crystal display device of the present disclosure is especially effective when an interior angle formed by the first direction and the second direction exceeds 180°. An interior angle is an inside angle formed by two straight lines, i.e., an angle on the center side of the display region.

Application Example 8

Furthermore, a liquid crystal display device of the present disclosure, which is in accordance with the liquid crystal display device disclosed in Application Example 7, is characterized in that the height of the spacers within the second region decreases approaching the first normal line or the second normal line, before the second substrate is arranged facing the first substrate.

Application Example 9

Furthermore, a liquid crystal display device of the present disclosure, which is in accordance with the liquid crystal display device disclosed in Application Example 7 or 8, is characterized in that the height of the spacers of smallest height within the second region is equal to or greater than the height of the spacers of greatest height within the third region, before the second substrate is arranged facing the first substrate.

Application Example 10

Furthermore, a liquid crystal display device of the present disclosure, which is in accordance with the liquid crystal display device disclosed in any one of
Application Examples 7 to 9, is characterized in that the height of the spacers in the third region is the same as or greater than the height of first spacers in the first region, before the second substrate is arranged facing the first substrate.

Application Example 11

A liquid crystal display device according to the present disclosure comprises: a first substrate; a second substrate arranged facing the first substrate; a liquid crystal layer interposed between the first substrate and the second substrate; a seal which is arranged between the first substrate and the second substrate so as to surround the liquid crystal layer; and spacers provided on a surface of the first substrate facing the liquid crystal layer. In this liquid crystal display device, the seal includes: a first sealing portion extending in a first direction, a second sealing portion extending in a second direction different from the first direction, and a third sealing portion smoothly joining the first sealing portion and the second sealing portion. The first sealing portion and the second sealing portion have a linear shape, and the third sealing portion has a curved shape such as an arcuate shape. In a plan view of the liquid crystal display device, a region for displaying an image constitutes a first region, a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and a region other than the first region and other than the second region constitutes a third region. In the liquid crystal display device of the present disclosure, the spacers in the second region are arranged overlapping a projection-shaped pattern provided in the second region on the surface of the first substrate facing the liquid crystal layer. Moreover, the liquid crystal display device of the present disclosure is especially effective when an interior angle formed by the first direction and the second direction exceeds 180°. An interior angle is an inside angle formed by two straight lines, i.e., an angle on the center side of the display region.

Application Example 12

A liquid crystal display device according to the present disclosure comprises: a first substrate; a second substrate arranged facing the first substrate; a liquid crystal layer interposed between the first substrate and the second substrate; a seal which is arranged between the first substrate and the second substrate so as to surround the liquid crystal layer; and spacers provided on a surface of the first substrate facing the liquid crystal layer. In this liquid crystal display device, the seal includes: a first sealing portion extending in a first direction, a second sealing portion extending in a second direction different from the first direction, and a third sealing portion smoothly joining the first sealing portion and the second sealing portion. The first sealing portion and the second sealing portion have a linear shape, and the third sealing portion has a curved shape such as an arcuate shape. In a plan view of the liquid crystal display device, a region for displaying an image constitutes a first region, a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and a region other than the first region and other than the second region constitutes a third region. In the liquid crystal display device of the present disclosure, the spacers in the second region are arranged so as to overlap facing a projection-shaped pattern provided in the second region on a surface of the second substrate facing the liquid crystal layer. Moreover, the liquid crystal display device of the present disclosure is especially effective when an interior angle formed by the first direction and the second direction exceeds 180°. An interior angle is an inside angle formed by two straight lines, i.e., an angle on the center side of the display region.

Advantage of the Invention

According to the present disclosure, the spacer arrangement density is increased in a region between a part where the outer peripheral shape of the seal surrounding the liquid crystal layer is indented and the display region, which thereby makes it possible to enhance the elastic force of the spacers and restrict display unevenness caused by gap unevenness.

That is to say, according to the present disclosure, the spacer arrangement density is increased in a region between a part where an interior angle of the seal surrounding the liquid crystal layer is 180° or more (a part which appears as a cutout from an imaginary rectangular display device) and the display region, which thereby makes it possible to enhance the elastic force of the spacers and restrict display unevenness caused by gap unevenness.

EMBODIMENTS OF THE INVENTION

Embodiment 1

The structure of a free-form display according to Embodiment 1 will be described with the aid of FIGS. 1 and 2.

Figure 1:
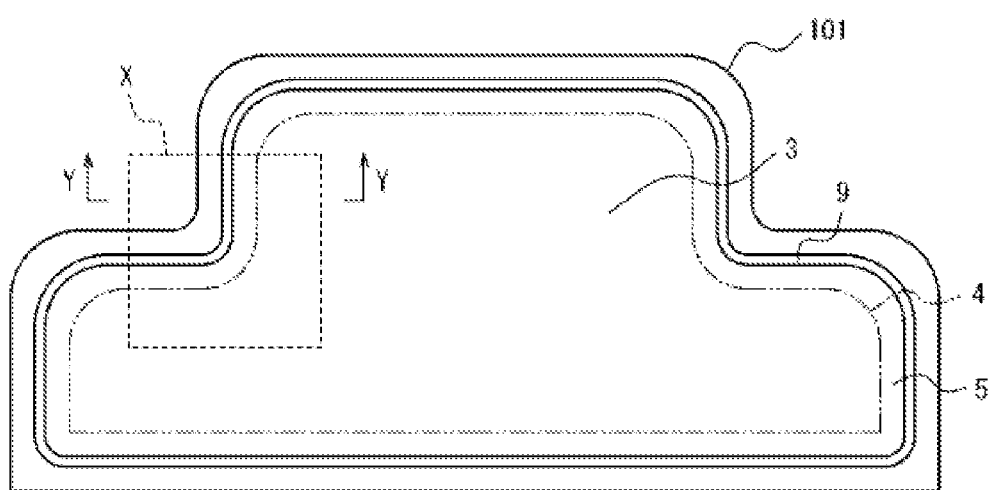
FIG. 1 is a plan view of a liquid crystal display device according to Embodiment 1.

FIG. 1 is a plan view of a liquid crystal panel 101 used in the free-form display of Embodiment 1 of the present disclosure.

A seal 9 is arranged on an inner side of the outer periphery of the liquid crystal panel 101, and a liquid crystal layer 3 is formed on an inner side of the seal 9. A display region 4 for displaying an image is further included in the liquid crystal layer 3. The liquid crystal panel 101 has an outer peripheral shape in which notches are formed at top right and top left angled portions of a rectangular shape, as seen on the page, and the liquid crystal layer 3 and the display region 4 surrounded by the seal 9 also have a shape with notches in the same way. Moreover, a non-display region on a peripheral edge portion of the liquid crystal layer 3, which is surrounded by the seal 9 and the display region 4, constitutes a frame region 5.

The outer peripheral shape of the corner portion of the notch in the liquid crystal panel 101 denoted by the region X enclosed by the dotted line is formed by rounding an angle. This shape suppresses the formation of cracks in a polarizing plate caused by stress concentration in a glass substrate and the polarizing plate constituting the liquid crystal panel 101, and also takes account of external shape workability of the glass substrate, as well as design properties. However, the shape may equally be angled rather than being rounded, depending on the shape of the outer periphery. Additionally, the seal 9 also has the same external shape with a rounded angle, but this is not only to correspond to the outer peripheral shape of the liquid crystal panel 101, it is also because a rounded shape is better suited to forming the seal 9 with a constant height and width than an angled shape.

Figure 2:
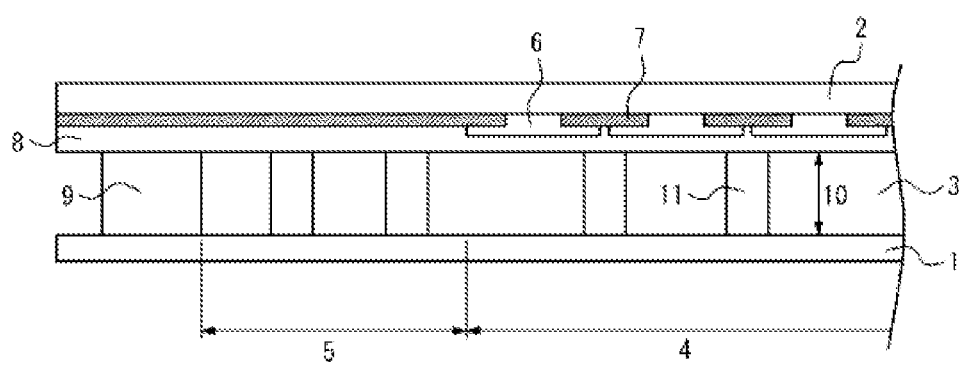
FIG. 2 is a view in cross section of the liquid crystal display device in FIG. 1.

FIG. 2 is a view in cross section showing the liquid crystal panel 101 in the cross section Y-Y of FIG. 1. The liquid crystal panel 101 has a structure in which an array substrate 1 and a color filter substrate 2 are bonded together with the liquid crystal layer 3 comprising liquid crystals interposed, and has an FFS (fringe-field switching) drive system. Pixels in the form of a matrix are formed by straight scanning signal lines and display signal lines on a surface of the array substrate 1 facing the liquid crystal layer 3 and corresponding to the display region 4 which displays the image, although these are not depicted, with a pixel electrode and a common electrode for driving the liquid crystals being formed in each pixel with an insulating layer interposed, and a TFT (thin film transistor), which is a switching element for supplying a potential to the pixel electrode, is further provided.

Meanwhile, a colorant 6 having a color such as RGB, a black matrix 7 for shielding inter-pixel wiring and a TFT region from light, and an overcoat film 8 for protecting the colorant 6 are formed correspondingly with each pixel on a surface of the color filter substrate 2 facing the liquid crystal layer 3. The black matrix 7 and the overcoat film 8 are formed so as to extend as far as the frame region 5, and block light around the display region 4.

Although not depicted, a polarizing plate is affixed to surfaces of the array substrate 1 and the color filter substrate 2 that do not face the liquid crystal layer 3, and an orientation film for orienting the liquid crystals is furthermore formed on surfaces of the array substrate 1 and the color filter substrate 2 that face the liquid crystal layer 3.

The liquid crystal layer 3 is surrounded at its periphery by the seal 9 and is sealed between the array substrate 1 and the color filter substrate 2. Here, a distance between the array substrate 1 and the color filter substrate 2 is referred to in particular as a cell gap 10. The liquid crystals are sealed so as to fill the cell gap 10, so the cell gap 10 is equal to the thickness of the liquid crystal layer 3. The seal 9 employs an elastic member such as silicone rubber. The seal 9 therefore has a role of sealing the liquid crystals while also serving as a spacer, to be described next, for maintaining the cell gap 10.

Columnar spacers 11 are formed on the surface of the color filter 2 facing the liquid crystal layer 3. The columnar spacers 11 are arranged so as to be inserted between the array substrate 1 and the color filter substrate 2, and function as supports for keeping the cell gap 10 in a fixed range. The columnar spacers 11 are members comprising a UV-photosensitive resin, for example, and are formed by pattern exposure employing a mask, so they can be reliably arranged at desired positions. Liquid crystals are absent from the parts where the columnar spacers 11 are present, and the liquid crystals are not oriented in the normal manner in regions around the columnar spacers 11, so the vicinity of the columnar spacers 11 forms a region where transmission and shielding of light from a backlight cannot be controlled. For this reason, when the columnar spacers 11 are arranged in the display region 4, they are arranged overlapping the black matrix 7 in a plan view so as to be shielded from light, to take account of ensuring that a display image is unaffected. The columnar spacers 11 have a greater height than the envisaged cell gap 10 before the array substrate 1 and the color filter substrate 2 are bonded together, the columnar spacers 11 being in a somewhat flattened state when the array substrate 1 and the color filter substrate 2 are bonded together to produce a predetermined cell gap 10. When the cell gap 10 is reduced because of external force or environmental temperature changes, the columnar spacers 11 restrict a further reduction by means of resilience thereof, and when the cell gap 10 increases, the columnar spacers 11 follow this increase by being restored in proportion to the extent to which they were flattened by being bonded together.

Figure 3:
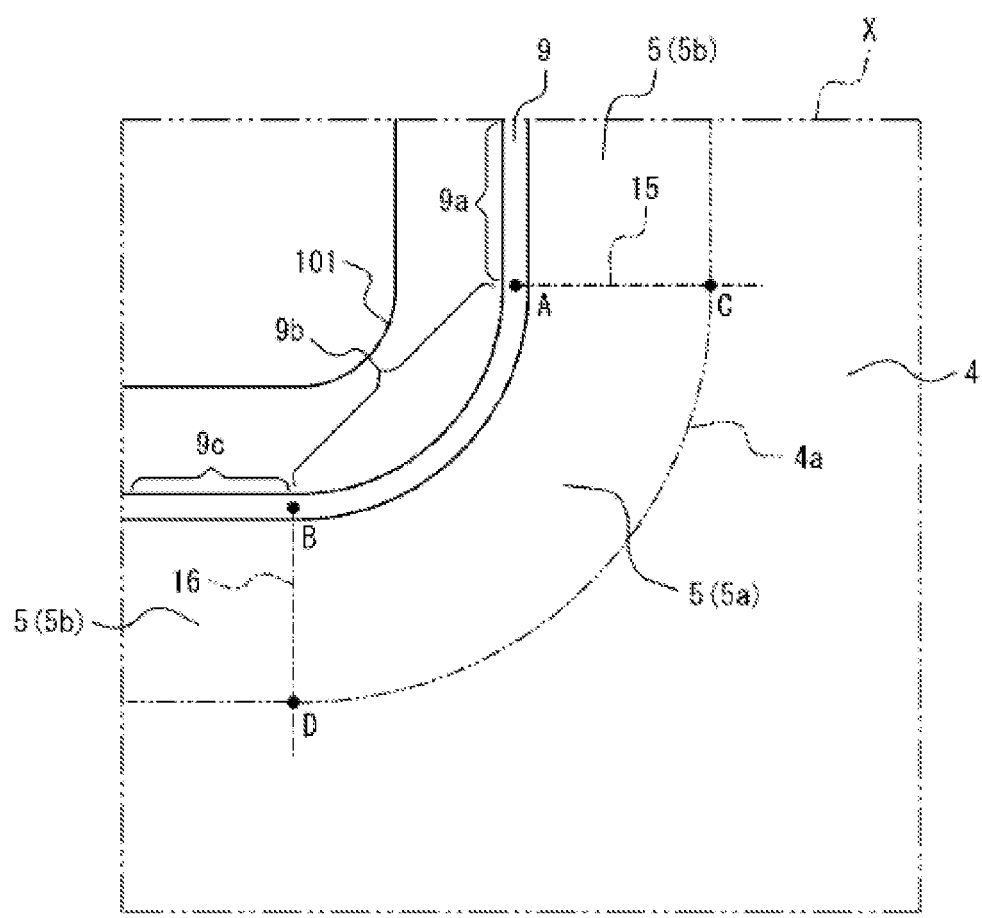
FIG. 3 is a plan view of a partial enlargement of the liquid crystal display device in FIG. 1.

The arrangement of the columnar spacers 11 around the notch in Embodiment 1 will be described next. FIG. 3 is a plan view of the notch in FIG. 1 in the region X surrounded by the dotted line. As described above, the liquid crystal panel 101 has an outer peripheral shape formed with the notch, and the liquid crystal layer 3 surrounded by the seal 9 formed inwardly of the outer periphery of the liquid crystal panel 101, and the display region 4 for displaying the image which is formed further inside the seal 9 also have the same shape with the notch. Here, the outer peripheral shape of the corner portion of the notch of the liquid crystal panel 101 has a rounded shape rather than an angle from the point of view of design properties, and also crack prevention and workability, and, furthermore, the seal 9 also has a rounded outer peripheral shape rather than an angle so as to make it easier to control the thickness and width of the seal when the seal is formed. Additionally, the outer peripheral shape of the display region 4 also has a rounded angle.

In Embodiment 1, the frame region 5 is divided into the following regions for the purpose of arranging the columnar spacers 11. In FIG. 3, the seal 9 at the notch first of all has a seal 9a which is a linear portion formed vertically toward the top of the page, a seal 9b which is a curved indent, and a seal 9c which is a linear portion formed horizontally toward the bottom of the page. Additionally, a boundary point between the seal 9a and the seal 9b is a point A, and a boundary point between the seal 9b and the seal 9c is a point B. Furthermore, intersections where a normal line 15 and a normal line 16 of the seal 9b extending downward from the points A and B to an outer peripheral line 4a of the display region 4 cross the outer peripheral line 4a are points C and D. Here, the frame region 5 enclosed by a line segment AB, a line segment BD, a line segment DC, and a line segment CA constitutes a frame region 5a in particular.

Additionally, regions other than the display region 4 and other than the frame region 5a, i.e., the frame region 5 between the display region 4 and the seal 9a or the seal 9c constituting the linear portions of the seal, serve as frame regions 5b in particular.

Figure 4:
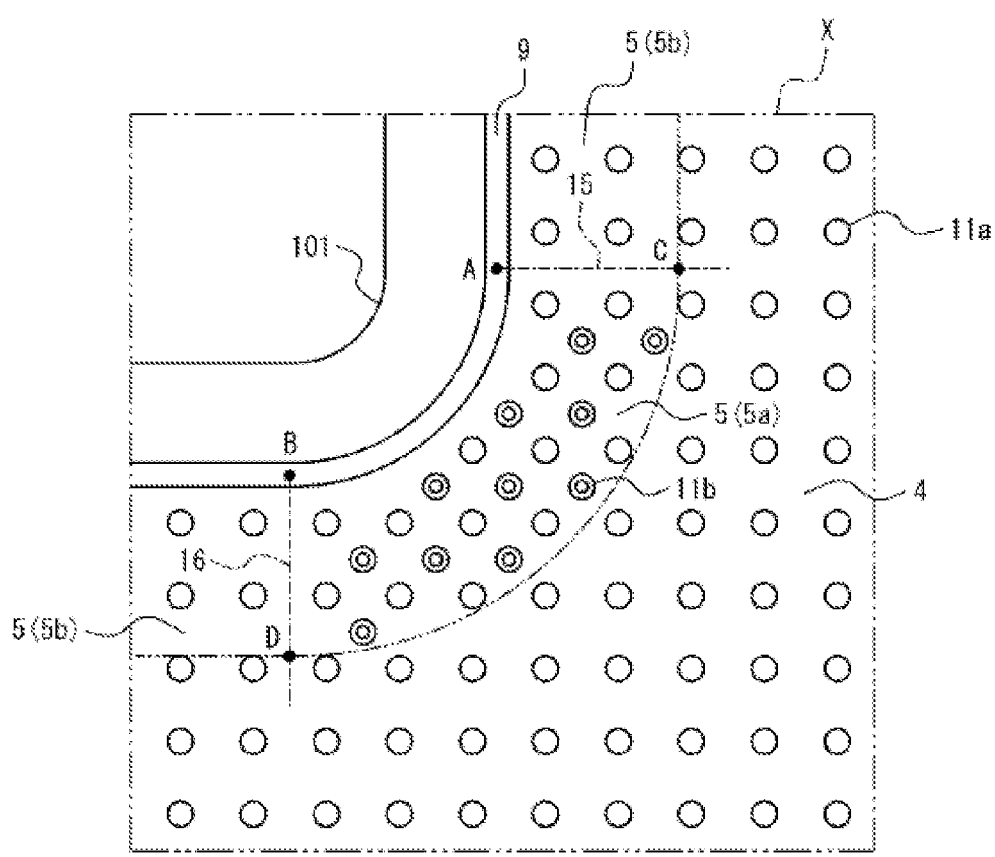
FIG. 4 is a plan view of a partial enlargement of the liquid crystal display device in FIG. 1.

The arrangement of the columnar spacers 11 in relation to each of the regions illustrated in FIG. 3 is shown next in FIG. 4. In FIG. 4, columnar spacers 11a indicated by a circle are arranged in equal numbers per surface area at an equal pitch in the display region 4, the frame region 5a, and the frame regions 5b, and columnar spacers 11b indicated by a double circle are further arranged only in the frame region 5a. Here, the columnar spacers 11a and the columnar spacers 11b are illustrated differently for ease of explanation, but they are columnar spacers 11 having the same specification, with the same cross-sectional area and height. That is to say, in the embodiment shown in FIG. 4, the columnar spacers 11, which are a combination of the columnar spacers 11a and the columnar spacers 11b, have the highest spacer arrangement density in the frame region 5a, as compared with the display region 4 and the frame regions 5b. It should be noted that here, the spacer arrangement density denotes the sum of surface areas, in a plan view, of the columnar spacers 11 which are provided per unit surface area of a substrate surface, i.e., the areal density.

The mode shown in FIG. 4 is an example of the present disclosure, and the spacer arrangement density and alignment of the columnar spacers 11a and the columnar spacers 11b may be freely set. For example, the arrangement may be set so that the columnar spacers 11a are not provided in the frame region 5a, and only the columnar spacers 11b are arranged at the same pitch as the columnar spacers 11a in the frame regions 5b, in which case the surface area in plan view per columnar spacer 11b is made greater than the surface area in plan view per columnar spacer 11a, whereby the spacer arrangement density of the columnar spacers 11 in the frame region 5a may be set higher than that of the frame regions 5b. That is to say, the spacer arrangement density of the columnar spacers 11 should be such that frame region 5b<frame region 5a.

As a further exemplary embodiment, the spacer arrangement density of the columnar spacers 11 in each region may be varied correspondingly with regions where gap unevenness arises. For example, when gap unevenness arises only at an indent of the notch, the spacer arrangement density may be set so that display region 4=frame region 5b<frame region 5a; when gap unevenness arises only at the indent of the notch and then in the frame region 5 outside of the notch portion, the spacer arrangement density may be set so that display region 4<frame region 5b<frame region 5a; and when display unevenness arises only at the indent of the notch and then in the display region 4, the spacer arrangement density may be set so that frame region 5b<display region 4<frame region 5a.

The effect of Embodiment 1 will be described next. In a liquid crystal panel, stress generated during processing of members and a panel production process remains within the glass substrate and the polarizing plate, but when the notch is present in the outer peripheral shape, this stress is concentrated toward the corner portion of the notch, and the cell gap 10 is likely to become narrower. As a result, gap unevenness, which is a localized variation in the cell gap 10, is produced at the corner portion of the notch, and this may cause display unevenness where there is a difference in brightness with the periphery. When the spacer arrangement density of the columnar spacers 11 around the corner portion of the notch is increased in accordance with the embodiment of the present disclosure, this enhances the elastic force of the spacers and makes it possible to restrict gap unevenness. Moreover, there are also other methods for restricting gap unevenness around the corner portion of the notch. For example, there is a method in which gap maintaining members such as spacers, or dummy seals instead, are arranged in the region outside of the seal 9. However, as the frames of liquid crystal panels have become narrower in recent years, it is difficult with this method to ensure a sufficiently large region for arranging the gap maintaining members in the region outside of the seal 9. Furthermore, there is also a method of increasing the spacer arrangement density around the corner portion of the notch within the region of the display region 4. However, in order to arrange the columnar spacers 11 within the region of the display region 4, it is necessary for the columnar spacers 11 to be arranged overlapping the black matrix 7, so there is a limit to the size in plan view of one columnar spacer 11, and since the columnar spacers 11 have an effect on rubbing, there is a risk of rubbing defects occurring around the columnar spacers 11, and taking this into account, there are large constraints on arrangement in terms of adding further columnar spacers 11, of which there are already a large number arranged over the whole of the display region 4, only to pixels around the corner portion of the notch. The spacer arrangement density of the columnar spacers 11 can be increased in Embodiment 1 without being subject to the constraints regarding the black matrix 7, etc. in the partial region of the frame region 5 which has no effect on display, so there are advantages of a higher degree of arrangement freedom and the ease of achieving a large effect.

Embodiment 2

Embodiment 1 described a mode in which the spacer arrangement density of the columnar spacers 11 in the display region 4, the frame region 5a, and the frame regions 5b is configured so that the spacer arrangement density is highest in the frame region 5a. In Embodiment 2, a further arrangement of the columnar spacers 11 within the region of the frame region 5a will be described.

Figure 5:
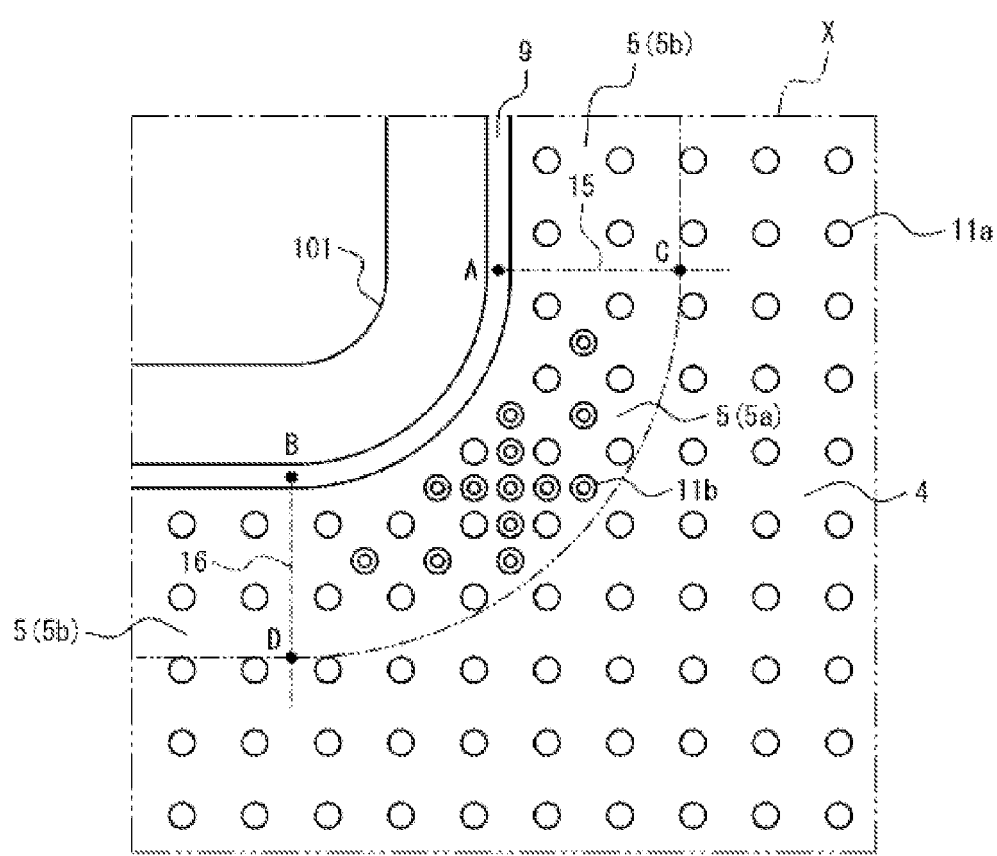
FIG. 5 is a plan view of a partial enlargement of a liquid crystal display device according to Embodiment 2 of the present invention.

FIG. 5 is a plan view showing the arrangement of the columnar spacers 11 within the region X in FIG. 1 according to Embodiment 2. In FIG. 5, the regions of the display region 4, the frame region 5a, and the frame regions 5b are set in the same way as illustrated in FIG. 3, and the columnar spacers 11a indicated by the circle in the same way as illustrated in FIG. 4 in Embodiment 1 are arranged in equal numbers per surface area at an equal pitch in the display region 4, the frame region 5a, and the frame regions 5b. Additionally, the columnar spacers 11b indicated by the double circle are arranged only in the frame region 5a, but in Embodiment 2, the columnar spacers 11b are not arranged evenly at an equal pitch within the region of the frame region 5a, rather they are arranged in a concentrated manner close to the center of the corner portion of the notch.

It was indicated above that, in a liquid crystal panel, internal stress generated during processing of members and the panel production process remains within the glass substrate and the polarizing plate, but when the notch is present in the outer peripheral shape, this stress is concentrated toward the corner portion of the notch from both sides of the notch, and there is likely to be an especially large variation in the cell gap 10 in the center of the corner portion of the notch. Accordingly, the spacer arrangement density of the columnar spacers 11 near the center of the corner portion of the notch in particular is also increased within the region of the frame region 5a, whereby variations in the cell gap 10 can be even more effectively restricted. It should be noted that the columnar spacers 11b are arranged in a concentrated manner near the center of the corner portion of the notch within the region of the frame region 5a, but this concentration is not limited to the central portion, depending on the shape of the notch, and the spacers should be arranged in the region where there is a large variation in the cell gap 10. Furthermore, there may be a plurality of regions within the frame region 5a where the columnar spacers 11b are arranged, depending on the shape of the notch, in which case the columnar spacers 11 should be arranged so that the spacer arrangement density thereof decreases from the region in which the columnar spacers 11b are arranged toward the end of the frame region 5a in proximity thereto.

In Embodiments 1 and 2, the spacer arrangement density of the columnar spacers 11 indicates the sum of surface areas, in a plan view, of the columnar spacers 11 which are provided per unit surface area of the substrate surface where the spacers are arranged, as described above. Accordingly, even if the spacer arrangement densities are the same, it is also possible to provide fewer columnar spacers 11 having a larger surface area in plan view, i.e., to provide fewer columnar spacers 11 having a larger diameter when the spacers are cylindrical, or to provide a larger number of columnar spacers 11 having a smaller surface area in plan view, i.e., to provide a larger number of columnar spacers 11 having a narrower diameter when the spacers are cylindrical.

A liquid crystal panel may employ a dual spacer structure in order to further control variations in the cell gap 10. A dual spacer structure means a structure in which two types of columnar spacers 11 having different heights are provided, and, during a normal situation, main spacers having a greater height contact the array substrate 1 and the color filter substrate 2 so as to maintain the cell gap 10, while sub-spacers having a smaller height normally contact only either one of the array substrate 1 and the color filter substrate 2, without contributing to maintaining the cell gap 10, and the sub-spacers contact both the array substrate 1 and the color filter substrate 2 only when the cell gap 10 has narrowed to a given extent or more, then contributing to maintaining the cell gap 10. In Embodiments 1 and 2, the method of arrangement of the columnar spacers 11 of the present disclosure is used for the arrangement of the main spacers having a greater height in a liquid crystal panel employing the dual spacer structure, which thereby makes it possible to achieve an effect of restricting gap unevenness at the notch. Furthermore, if the dual spacer structure is used within the region of the display region 4, and only the main spacers are arranged within the region of the frame region 5, the method of arrangement of the present disclosure may be used in relation to the arrangement of the main spacers.

Embodiment 3

In Embodiments 1 and 2, a description was given of the liquid crystal panel 101 in which gap unevenness at the corner portion of the notch is restricted by increasing the spacer arrangement density in the frame region 5a in relation to the other regions. Embodiment 3 describes a mode in which a dummy seal 21 endowed with a spacer function is arranged in the frame region 5a, rather than the columnar spacers 11.

Figure 6:
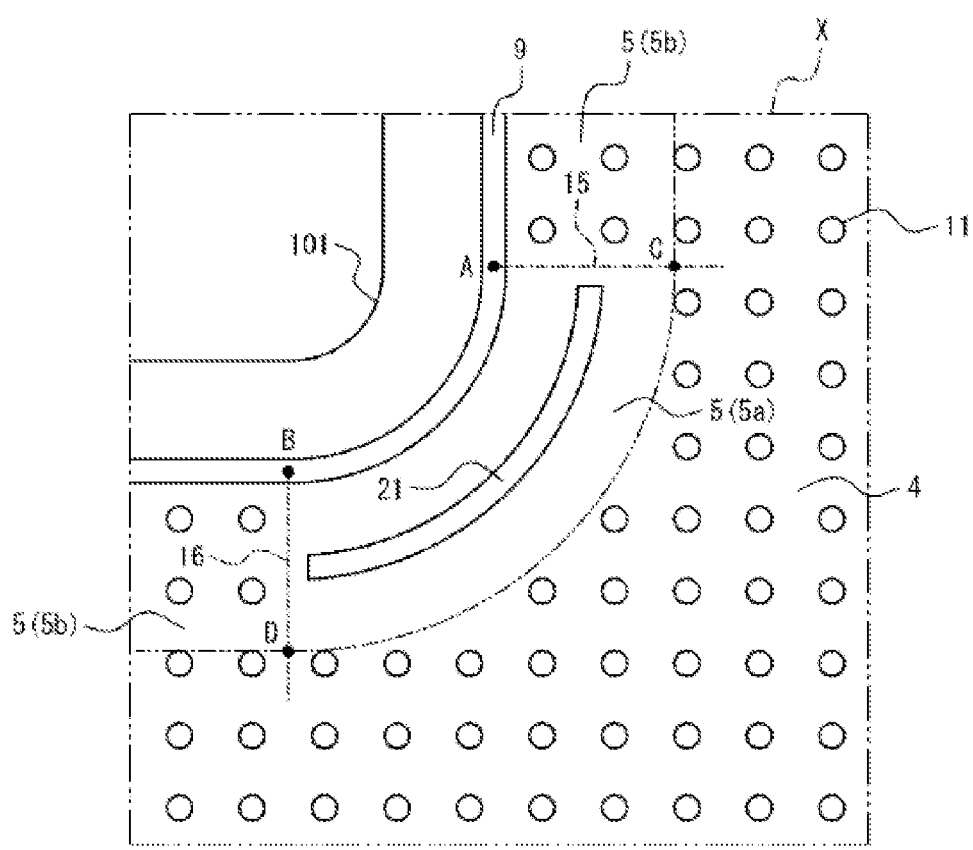
FIG. 6 is a plan view of a partial enlargement of a liquid crystal display device according to Embodiment 3 of the present invention.

FIG. 6 is a plan view showing the arrangement of the columnar spacers 11 and the dummy seal 21 within the region X in FIG. 1 according to Embodiment 3. In FIG. 6, the regions of the display region 4, the frame region 5a, and the frame regions 5b are set in the same way as illustrated in FIG. 3, and the columnar spacers 11 indicated by the circle in the same way as in Embodiment 1 are arranged in equal numbers per surface area at an equal pitch in the display region 4 and the frame regions 5b. In Embodiment 3, the dummy seal 21 formed at the same time as the seal 9 is further arranged only in the frame region 5a.

The dummy seal 21 is formed at the same time as the seal 9 and from the same material, and it also has the same height. However, the shape thereof, including the surface area and width, are not limited to what is illustrated in FIG. 6, and the shape should be set in accordance with the situation. Furthermore, a single dummy seal 21 is formed on its own in the frame regions 5b in FIG. 6, but this is not limiting, and a plurality of dummy seals 21 may be formed, or the dummy seal 21 may be arranged together with columnar spacers 11.

The seal 9 essentially forms a seal between the array substrate 1 and the color filter substrate 2 while surrounding the liquid crystals of the liquid crystal layer 3, but at the same time, it also has a spacer function for keeping the cell gap 10 in a fixed range. By arranging the dummy seal 21 having the same height as the seal 9 in the frame region 5a, as described in Embodiment 3, it is possible for the dummy seal 21 also to function as a spacer for maintaining the cell gap 10 at the notch portion.

Embodiment 4

Embodiments 1 and 2 described a mode in which the spacer arrangement density in the frame region 5a is higher than in the frame regions 5b. Embodiment 4 describes a mode in which the spacer height in the frame region 5a is made greater than the spacer height in the frame regions 5b.

Figure 7:
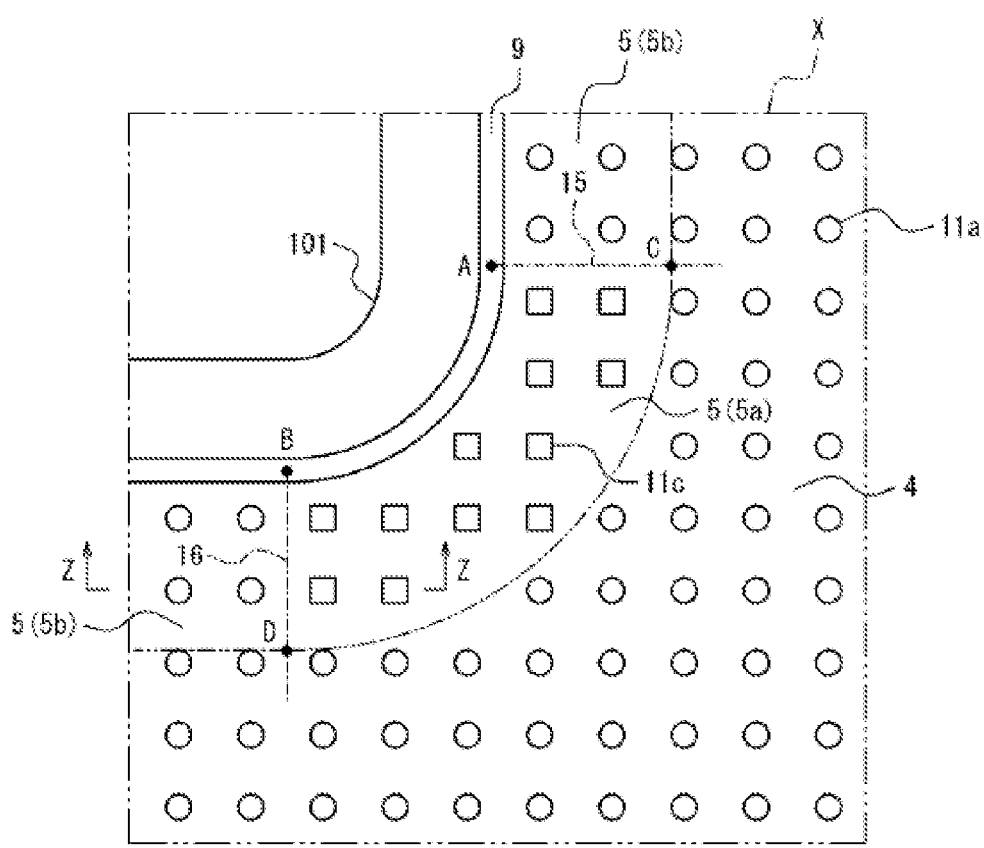
FIG. 7 is a plan view of a partial enlargement of a liquid crystal display device according to Embodiment 4 of the present invention.
Figure 8:
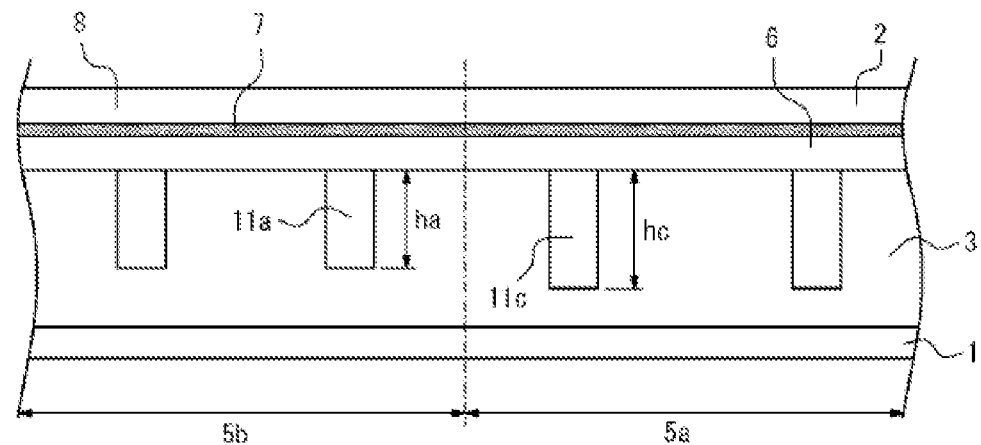
FIG. 8 is a view in cross section of the liquid crystal display device in FIG. 7.
Figure 9:
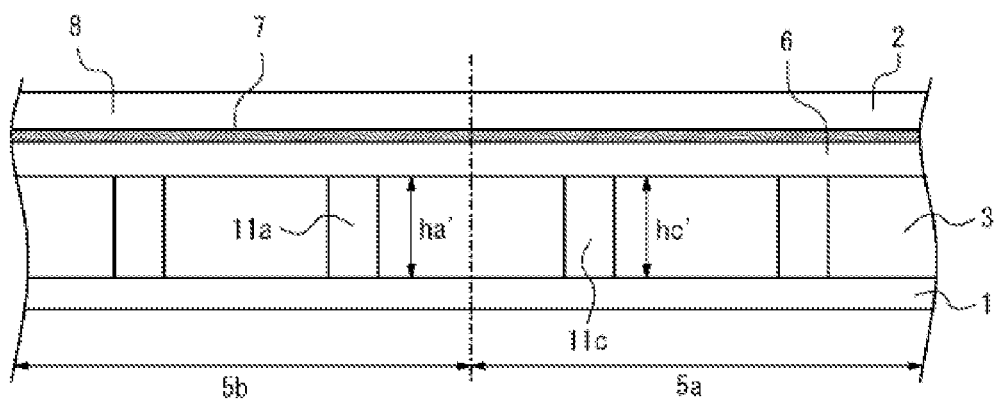
FIG. 9 is a view in cross section of the liquid crystal display device in FIG. 7.

FIG. 7 is a plan view showing the arrangement of the columnar spacers 11 within the region X of FIG. 1 in Embodiment 4, and FIGS. 8 and 9 are views in cross section showing the cross section Z-Z in FIG. 7. Furthermore, FIG. 8 shows the situation before the array substrate 1 and the color filter substrate 2 are bonded together, and FIG. 9 shows the situation after bonding. In FIG. 7, the regions of the display region 4, the frame region 5a, and the frame regions 5b are set in the same way as illustrated in FIG. 3, and the columnar spacers 11a indicated by the circle in the same way as in Embodiment 1 are arranged in equal numbers per surface area at an equal pitch in the display region 4 and the frame regions 5b. In Embodiment 4, columnar spacers 11c of greater height and having the same cross-sectional area as the columnar spacers 11a are further arranged only in the frame region 5a. In FIG. 7, the columnar spacers 11c are indicated by a square, but this is only for ease of description, and the shape in plan view of the columnar spacers 11c is the same as that of the columnar spacers 11a. As shown in FIG. 8, a height hc of the columnar spacers 11c is greater than a height ha of the columnar spacers 11a (hc>ha), before the array substrate 1 and the color filter substrate 2 are bonded together. However, after the array substrate 1 and the color filter substrate 2 have been bonded together, the columnar spacers 11c are deformed and flattened to a greater extent than the columnar spacers 11a, as shown in FIG. 9, and they appear to have the same height as a result (hc'=ha'). By virtue of such a configuration, the columnar spacers 11c have greater resilience than the columnar spacers 11a for maintaining the cell gap in a state in which the array substrate 1 and the color filter substrate 2 have been bonded together, and even if the frame region 5a is subjected to greater stress than the frame regions 5b, the columnar spacers 11c still demonstrate the function of maintaining the cell gap 10. The increased height of the columnar spacers 11c arranged in the frame region 5a in this way demonstrates the same effects as in Embodiment 1, where the spacer arrangement density of the columnar spacers 11 arranged in the frame region 5a is increased.

It should be noted that the columnar spacers 11c having a different height should be formed by using a half-tone mask, which has a gray color tone rather than black or white, as the mask which is employed for exposure in the process of forming the columnar spacers 11, for example.

Figure 10:
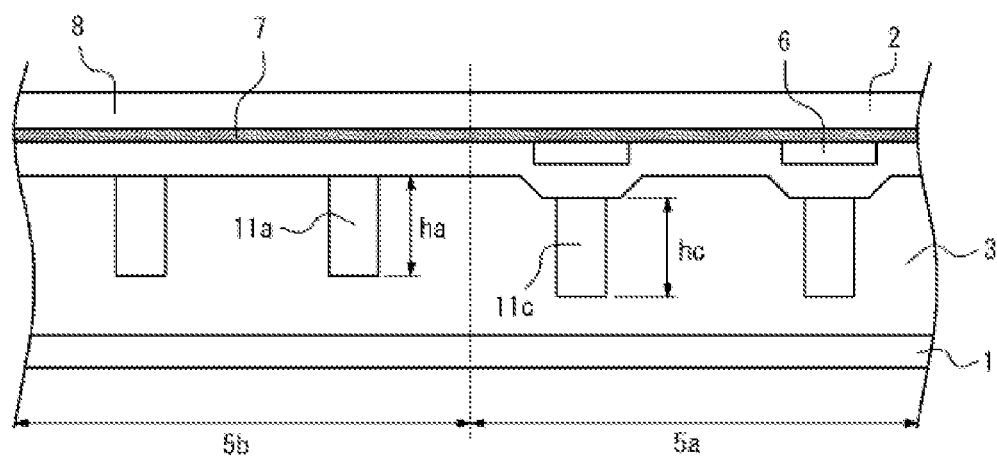
FIG. 10 is a view in cross section of the liquid crystal display device in FIG. 7.
Figure 11:
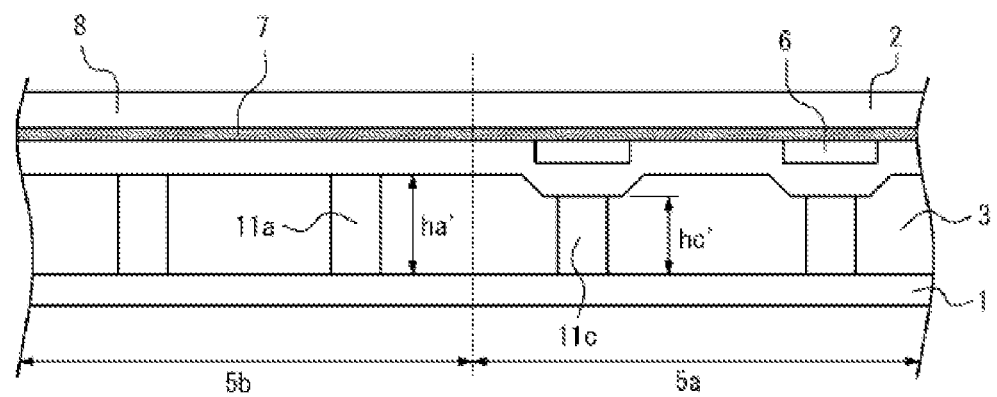
FIG. 11 is a view in cross section of the liquid crystal display device in FIG. 7.

As a different mode of Embodiment 4, a projection-shaped pattern may be provided on the surface of the color filter substrate 2 facing the liquid crystal layer 3, and the columnar spacers 11c may be arranged so as to overlap this pattern. FIG. 10 and FIG. 11 are views in cross section showing the cross section Z-Z in FIG. 7. Furthermore, FIG. 10 shows the situation before the array substrate 1 and the color filter substrate 2 are bonded together, and FIG. 11 shows the situation after bonding. In this embodiment, as shown in FIG. 10, before the array substrate 1 and the color filter substrate 2 are bonded together, the heights of the actual columnar spacers 11 are the same for the columnar spacers 11a and the columnar spacers 11c (hc=ha), but a pattern in the colorant 6 is provided at the positions where the columnar spacers 11c are arranged. Accordingly, in a state in which the array substrate 1 and the color filter substrate 2 have been bonded together, the columnar spacers 11c are deformed and flattened to a greater extent than the columnar spacers 11a in proportion to the thickness of the pattern in the colorant 6 (hc'<ha'), as shown in FIG. 11, and the effect demonstrated is the same as that when the height of the actual columnar spacers 11c is increased. This mode may be realized by also forming the pattern in the colorant 6 at the positions in the frame regions 5b where the columnar spacers 11 are arranged, in the process of forming the colorant 6 in the display region 4 of the color filter substrate 2, for example. Alternatively, the pattern may be formed by a photocurable overcoat.

Moreover, the same effect is also demonstrated when the projection-shaped pattern is provided on the surface of the array substrate 1 facing the liquid crystal layer 3, and the columnar spacers 11c are arranged so as to overlap the pattern. This mode may be realized by forming an insulating film pattern for insulating gate wiring and source wiring of the array substrate 1 only at the positions in the frame region 5a where the columnar spacers 11c are arranged.

The increased height of the columnar spacers 11 within certain regions as described in Embodiment 4 demonstrates the same effects as with the increased spacer arrangement density of the columnar spacers 11 described in Embodiments 1 and 2. Accordingly, the mode in which the spacer arrangement density of the columnar spacers 11 is varied in the display region 4, the frame region 5a, and the frame regions 5b described in Embodiment 1 also demonstrates the same effects as the mode in which columnar spacers 11 with different heights of the columnar spacers 11 are provided. Furthermore, the mode in which the spacer arrangement density of the columnar spacers 11 is varied within the region of the frame region 5a, as in Embodiment 2, also demonstrates the same effects as the mode in which columnar spacers 11 with different heights of the columnar spacers 11 are provided.

Embodiment 5

The structure of a non-rectangular display according to Embodiment 5 will be described with the aid of FIGS. 12 and 13.

Figure 12:
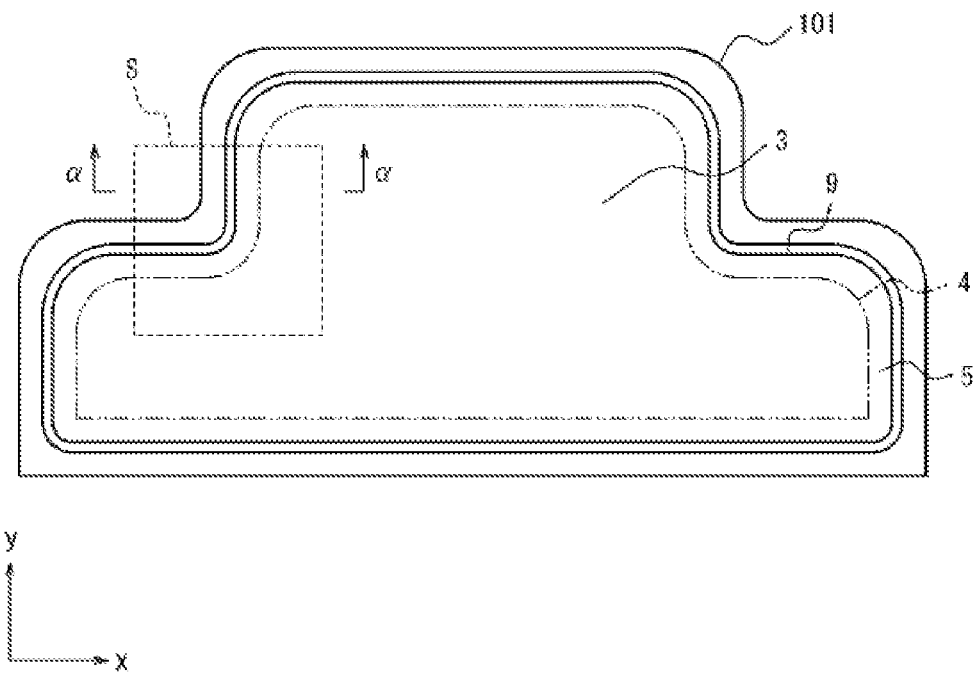
FIG. 12 is a plan view of a liquid crystal display device according to Embodiment 5.

FIG. 12 is a plan view of a liquid crystal display device according to Embodiment 5 of the present disclosure. The liquid crystal display device is the liquid crystal panel 101 constituting a non-rectangular display.

The seal 9 is arranged on the inner side of the outer periphery of the liquid crystal panel 101, and the liquid crystal layer 3 is formed on the inner side of the seal 9. The display region 4 for displaying an image is further included in the liquid crystal layer 3. The liquid crystal panel 101 has an outer peripheral shape in which cutouts are formed at top right and top left angled portions of an imaginary rectangular shape, as seen on the page, and the liquid crystal layer 3 and the display region 4 (first region) surrounded by the seal 9 also have a shape with cutouts in the same way. Moreover, a non-display region on a peripheral edge portion of the liquid crystal layer 3, which is surrounded by the seal 9 and the display region 4, constitutes the frame region 5. The frame region 5 is a region on the inner side of the seal 9 which does not contribute to the display.

The outer peripheral shape of the corner portion of the cutout in the liquid crystal panel 101 denoted by the region S enclosed by the dotted line is formed by applying a smoothly-varying curved shape to an angle where sides intersect each other. This shape suppresses the formation of cracks in the polarizing plate caused by stress concentration in the glass substrate and the polarizing plate constituting the liquid crystal panel 101, and also takes account of external shape workability of the glass substrate, as well as design properties. However, the shape may equally have an angle where straight lines intersect each other, rather than having a smooth curved shape, depending on the shape of the outer periphery. Additionally, the seal 9 also has the same external shape with the smooth curved shape being applied to the angle, but this is not only to correspond to the outer peripheral shape of the liquid crystal panel 101, it is also because a smooth curved shape is better suited to forming the seal 9 with a constant height and width than an angled shape.

Figure 13:
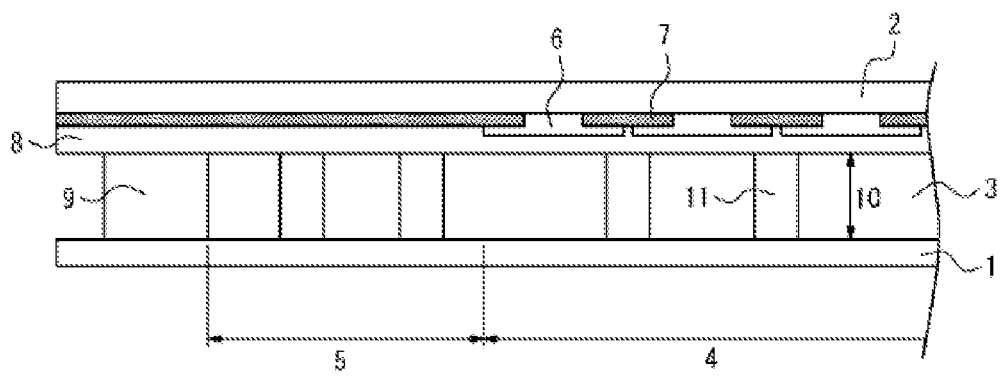
FIG. 13 is a view in cross section of the liquid crystal display device in FIG. 12.

FIG. 13 is a view in cross section showing the liquid crystal panel 101 in the cross section α-α of FIG. 12. The liquid crystal panel 101 has a structure in which the array substrate 1 and the color filter substrate 2 are bonded together with the liquid crystal layer 3 comprising liquid crystals interposed, and has an FFS (fringe-field switching) drive system. Pixels in the form of a matrix are formed by straight scanning signal lines and display signal lines on the surface of the array substrate 1 facing the liquid crystal layer 3 and corresponding to the display region 4 which displays the image, although these are not depicted, with a pixel electrode and a common electrode for driving the liquid crystals being formed in each pixel with an insulating layer interposed, and a TFT (thin film transistor), which is a switching element for supplying a potential to the pixel electrode, is further provided.

Meanwhile, the colorant 6 having a color such as RGB, the black matrix 7 for shielding the inter-pixel wiring and the TFT region from light, and the overcoat film 8 for protecting the colorant 6 are formed correspondingly with each pixel on the surface of the color filter substrate 2 facing the liquid crystal layer 3. The black matrix 7 and the overcoat film 8 are formed so as to extend as far as the frame region 5, and block light around the display region 4.

Although not depicted, a polarizing plate is affixed to the surfaces of the array substrate 1 and the color filter substrate 2 that do not face the liquid crystal layer 3, and an orientation film for orienting the liquid crystals is furthermore formed on the surfaces of the array substrate 1 and the color filter substrate 2 that face the liquid crystal layer 3.

The liquid crystal layer 3 is surrounded at its periphery by the seal 9 and is sealed between the array substrate 1 and the color filter substrate 2. Here, the distance between the array substrate 1 and the color filter substrate 2 is referred to in particular as the cell gap 10. The liquid crystals are sealed so as to fill the cell gap 10, so the cell gap 10 is equal to the thickness of the liquid crystal layer 3. The seal 9 employs an elastic member such as silicone rubber. The seal 9 therefore has a role of sealing the liquid crystals while also serving as a spacer for maintaining the cell gap 10.

The columnar spacers 11 are formed on the surface of the color filter 2 facing the liquid crystal layer 3. Accordingly, in this embodiment, the color filter substrate 2 constitutes the first substrate and the array substrate 1 constitutes the second substrate. The columnar spacers 11 are arranged so as to be inserted between the array substrate 1 and the color filter substrate 2, and function as supports for keeping the cell gap 10 in a fixed range. The columnar spacers 11 are members comprising a UV-photosensitive resin, for example, and are formed by pattern exposure employing a mask, so they can be reliably arranged at desired positions. Liquid crystals are absent from the parts where the columnar spacers 11 are present, and the liquid crystals are not oriented in the normal manner in regions around the columnar spacers 11, so the vicinity of the columnar spacers 11 forms a region where transmission and shielding of light from the backlight cannot be controlled. For this reason, when the columnar spacers 11 are arranged in the display region 4, they are arranged overlapping the black matrix 7 in a plan view so as to be shielded from light, to take account of ensuring that the display image is unaffected. The columnar spacers 11 have a greater height than the envisaged cell gap 10 before the array substrate 1 and the color filter substrate 2 are bonded together, the columnar spacers 11 being in a somewhat flattened state when the array substrate 1 and the color filter substrate 2 are bonded together to produce a predetermined cell gap 10. When the cell gap 10 is reduced because of external force or environmental temperature changes, the columnar spacers 11 restrict a further reduction by means of resilience thereof, and when the cell gap 10 increases, the columnar spacers 11 follow this increase by being restored in proportion to the extent to which they were flattened by being bonded together.

Figure 14:
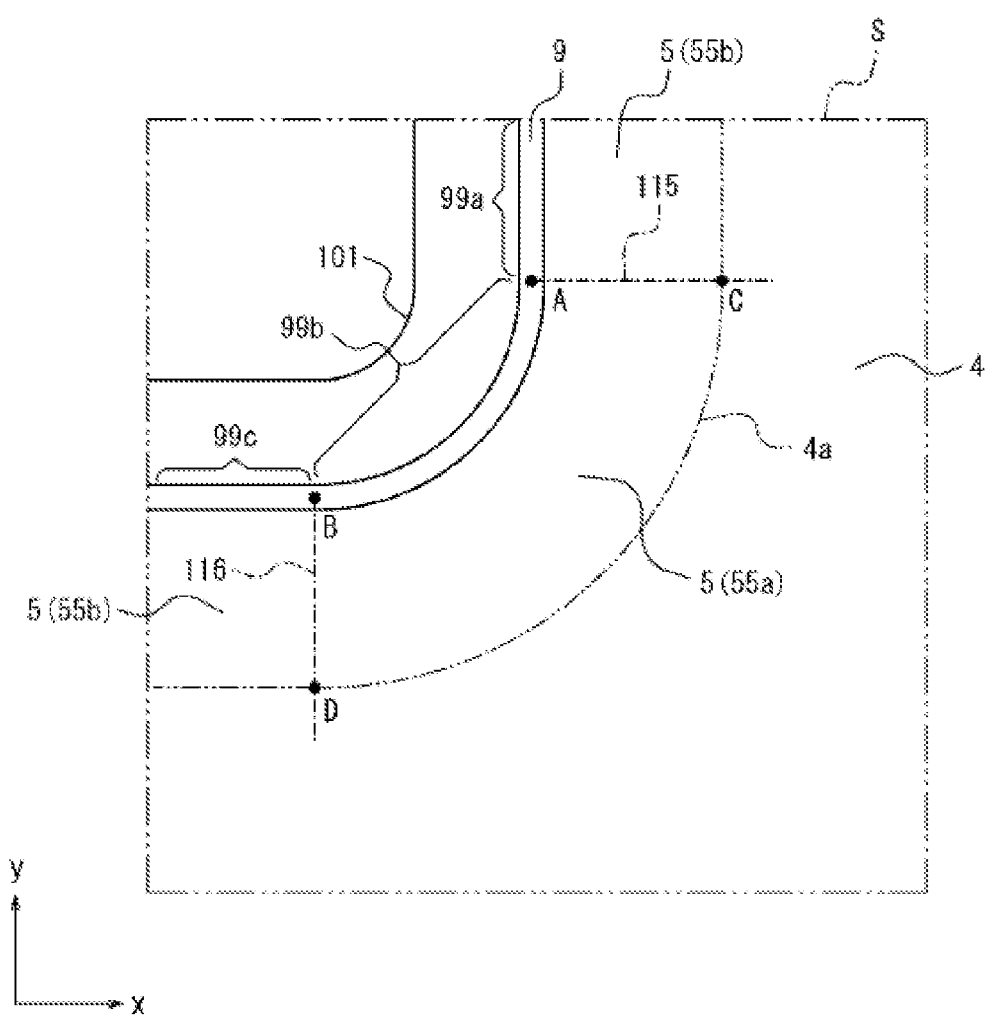
FIG. 14 is a plan view of a partial enlargement of the liquid crystal display device in FIG. 12.

The arrangement of the columnar spacers 11 around the cutout in Embodiment 5 will be described next. FIG. 14 is a plan view of the cutout in FIG. 12 in the region S surrounded by the dotted line. As described above, the liquid crystal panel 101 has an outer peripheral shape formed with the cutout, and the liquid crystal layer 3 surrounded by the seal 9 formed inwardly of the outer periphery of the liquid crystal panel 101, and the display region 4 for displaying the image which is formed further inside the seal 9 also have the same shape with the cutout. Here, the outer peripheral shape of the corner portion of the cutout of the liquid crystal panel 101 has a curved shape which changes in a smooth arc rather than an angle where straight lines intersect from the point of view of design properties, and also crack prevention and workability. Furthermore, the seal 9 also has a smoothly-varying curved shape rather than an angle so as to make it easier to control the thickness and width of the seal when the seal is formed. Additionally, the outer peripheral shape of the display region 4 also has a smoothly-varying curved shape applied to the angle.

In Embodiment 5, the frame region 5 is divided into the following regions for the purpose of arranging the columnar spacers 11. In FIG. 14, the seal 9 at the cutout first of all has a second seal linear portion 99a which is a linear portion formed vertically toward the top of the page, a third seal curved portion 99b which is a curved indent, and a first seal linear portion 99c which is a linear portion formed horizontally toward the bottom of the page. That is to say, if a direction along an x-axis is a first direction and a direction along a y-axis is a second direction, then the seal 9 at the cutout includes: a first sealing portion (first seal linear portion 99c) extending in the first direction, a second sealing portion (second seal linear portion 99a) extending in the second direction which differs from the first direction by an interior angle of 270°, and a third sealing portion (third seal curved portion 99b) which smoothly joins the first sealing portion and the second sealing portion. Additionally, a boundary point between the second sealing portion (second seal linear portion 99a) and the third sealing portion (third seal curved portion 99b) is a point A, and a boundary point between the third sealing portion (third seal curved portion 99b) and the first sealing portion (first seal linear portion 99c) is a point B. Furthermore, intersections where a second normal line 115 and a first normal line 116 extending downward from the points A and B to the outer peripheral line 4a of the display region 4 cross the outer peripheral line 4a are points C and D. Here, the frame region 5 enclosed by a line segment AB of the third sealing portion, a line segment BD of the first normal line 116, a line segment DC constituting the outer periphery of the first region, and a line segment CA of the second normal line 115 constitutes an angle portion frame region 55a (second region).

Additionally, regions other than the display region 4 (first region) and other than the angle portion frame region 55a (second region), i.e., the frame region 5 between the display region 4 and the second seal linear portion 99a or the first seal linear portion 99c constituting the linear portions of the seal, serve as linear portion frame regions 55b (third region) in particular.

Figure 15:
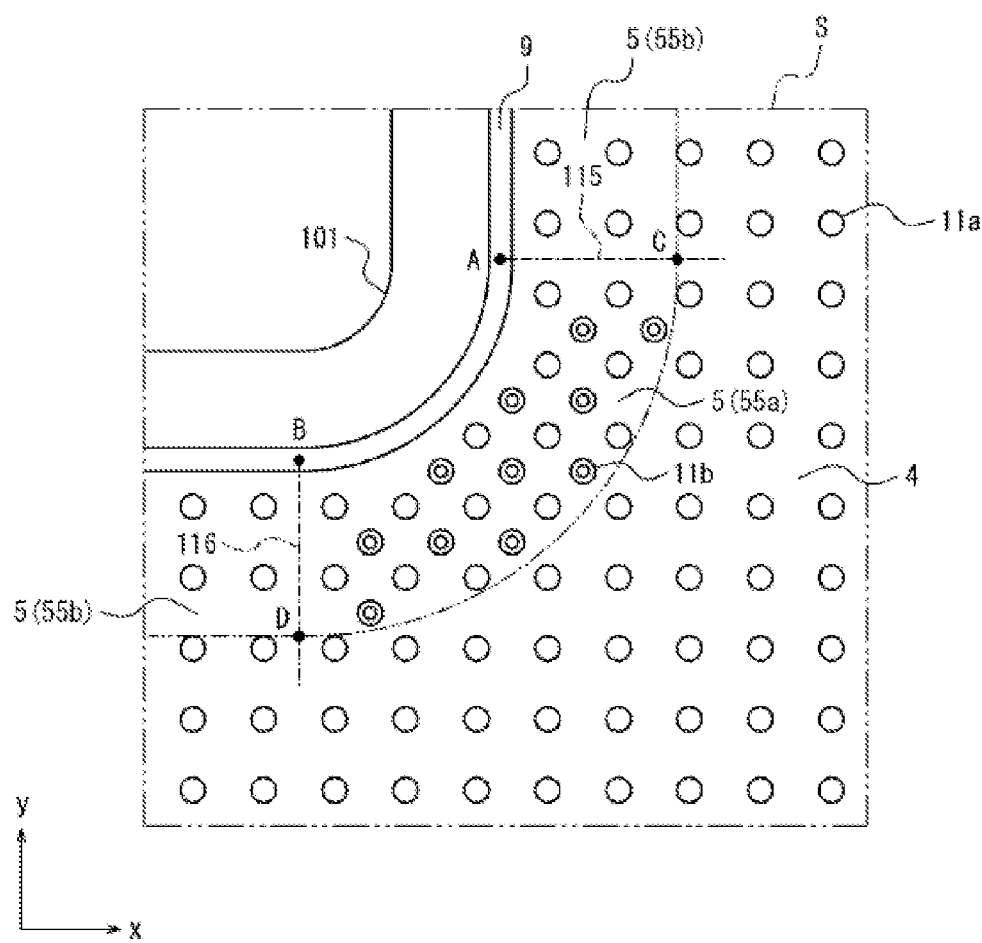
FIG. 15 is a plan view of a partial enlargement of the liquid crystal display device in FIG. 12.

The arrangement of the columnar spacers 11 in relation to each of the regions illustrated in FIG. 14 is shown next in FIG. 15. In FIG. 15, the columnar spacers 11a indicated by a circle are arranged in equal numbers per surface area at an equal pitch in the display region 4, the angle portion frame region 55a and the linear portion frame regions 55b, and the columnar spacers 11b indicated by a double circle are further arranged only in the angle portion frame region 55a. Here, the columnar spacers 11a and the columnar spacers 11b are illustrated differently for ease of explanation, but they are columnar spacers 11 having the same specification, with the same cross-sectional area and height. That is to say, in the mode shown in FIG. 15, the columnar spacers 11, which are a combination of the columnar spacers 11a and the columnar spacers 11b, have the highest spacer arrangement density in the angle portion frame region 55a, as compared with the display region 4 and the linear portion frame regions 55b. It should be noted that here, the spacer arrangement density denotes the sum of surface areas, in a plan view, of the columnar spacers 11 which are provided per unit surface area of the substrate surface, i.e., the areal density.

The mode shown in FIG. 15 is an example of the present disclosure, and the spacer arrangement density and alignment of the columnar spacers 11a and the columnar spacers 11b may be freely set. For example, the arrangement may be set so that the columnar spacers 11a are not provided in the angle portion frame region 55a, and only the columnar spacers 11b are arranged at the same pitch as the columnar spacers 11a in the linear portion frame regions 55b, in which case the surface area in plan view per columnar spacer 11b is made greater than the surface area in plan view per columnar spacer 11a, whereby the spacer arrangement density of the columnar spacers 11 in the angle portion frame region 55a may be set at or above the spacer arrangement density in the linear portion frame regions 55b. That is to say, the spacer arrangement density of the columnar spacers 11 should be such that (spacer arrangement density in linear portion frame regions 55b)≤(spacer arrangement density in angle portion frame region 55a).

As a further exemplary embodiment, the spacer arrangement density of the columnar spacers 11 in each region may be varied correspondingly with regions where gap unevenness arises. For example, when gap unevenness arises only at an indent of the cutout, the spacer arrangement density is set so that (spacer arrangement density in display region 4)=(spacer arrangement density in linear portion frame regions 55b)<(spacer arrangement density in angle portion frame region 55a). Furthermore, when gap unevenness arises only at the indent of the cutout and then in the frame region 5 outside of the cutout, the spacer arrangement density may be set so that (spacer arrangement density in display region 4)<(spacer arrangement density in linear portion frame regions 55b)<(spacer arrangement density in angle portion frame region 55a). Additionally, when display unevenness arises only at the indent of the cutout and then in the display region 4, the spacer arrangement density may be set so that (spacer arrangement density in linear portion frame regions 55b)<(spacer arrangement density in display region 4)<(spacer arrangement density in angle portion frame region 55a).

The effect of Embodiment 5 will be described next. In a liquid crystal panel, stress generated during processing of members and the panel production process remains within the glass substrate and the polarizing plate, but when the cutout is present in the outer peripheral shape, i.e., when the interior angle formed by the linear first sealing portion and second sealing portion exceeds 180°, this stress is concentrated toward the corner portion of the cutout, and the cell gap 10 is likely to become narrower. As a result, gap unevenness, which is a localized variation in the cell gap 10, is produced at the corner portion of the cutout, and this may cause display unevenness where there is a difference in brightness with the periphery. When the spacer arrangement density of the columnar spacers 11 around the corner portion of the cutout is increased in accordance with the embodiment of the present disclosure, this enhances the elastic force of the spacers and makes it possible to restrict gap unevenness. Moreover, there are also other methods for restricting gap unevenness around the corner portion of the cutout. For example, there is a method in which gap maintaining members such as spacers, or dummy seals instead, are arranged in the region outside of the seal 9. However, as the frames of liquid crystal panels have become narrower in recent years, it is difficult with this method to ensure a sufficiently large region for arranging the gap maintaining members in the region outside of the seal 9. Furthermore, there is also a method of increasing the spacer arrangement density around the angle portion of the cutout within the region of the display region 4. However, in order to arrange the columnar spacers 11 within the region of the display region 4, it is necessary for the columnar spacers 11 to be arranged overlapping the black matrix 7, so there is a limit to the size in plan view of one columnar spacer 11, and since the columnar spacers 11 have an effect on rubbing, there is a risk of rubbing defects occurring around the columnar spacers 11, and taking this into account, there are large constraints on arrangement in terms of adding further columnar spacers 11, of which there are already a large number arranged over the whole of the display region 4, only to pixels around the corner portion of the cutout. The spacer arrangement density of the columnar spacers 11 can be increased in Embodiment 5 without being subject to the constraints regarding the black matrix 7, etc. in the partial region of the frame region 5 which has no effect on display, so there are advantages of a higher degree of arrangement freedom and the ease of achieving a large effect. Moreover, these effects are more pronounced when the interior angle formed by the first direction along which the first sealing portion lies and the second direction along which the second sealing portion lies is greater than 180°. This embodiment introduced an example in which the interior angle formed by the first direction and the second direction is 270°, but the effect of the present disclosure is enhanced the more this angle is greater than 180° and closer to 360°.

Embodiment 6

Embodiment 5 described a mode in which the spacer arrangement density of the columnar spacers 11 in the display region 4, the angle portion frame region 55a, and the linear portion frame regions 55b is configured so that the spacer arrangement density is highest in the angle portion frame region 55a. In Embodiment 6, a further arrangement of the columnar spacers 11 within the region of the angle portion frame region 55a will be described.

Figure 16:
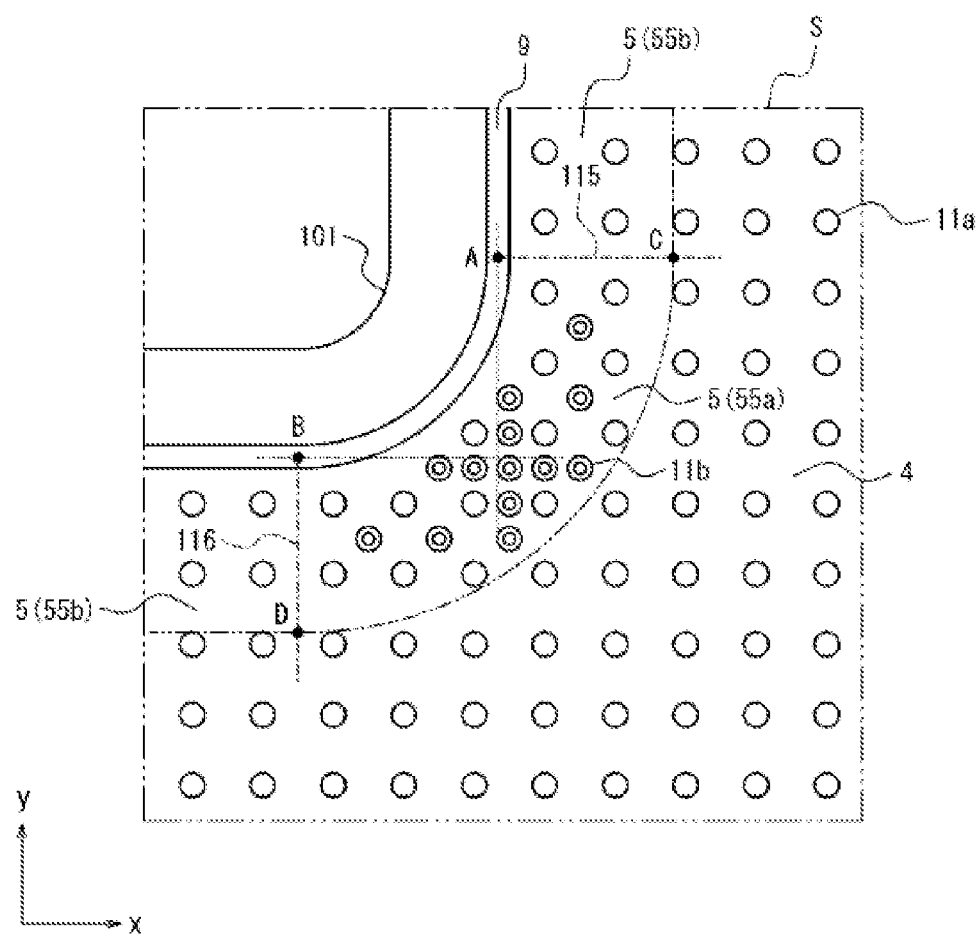
FIG. 16 is a plan view of a partial enlargement of a liquid crystal display device according to Embodiment 6 of the present invention.

FIG. 16 is a plan view showing the arrangement of the columnar spacers 11 within the region S in FIG. 12 according to Embodiment 6. In FIG. 16, the regions of the display region 4, the angle portion frame region 55a, and the linear portion frame regions 55b are set in the same way as illustrated in FIG. 14, and the columnar spacers 11a indicated by the circle in the same way as illustrated in FIG. 15 in Embodiment 5 are arranged in equal numbers per surface area at an equal pitch in the display region 4, the angle portion frame region 55*a*, and the linear portion frame regions 55*b*. Additionally, the columnar spacers 11*b* indicated by the double circle are arranged only in the angle portion frame region 55*a*, but in Embodiment 6, the columnar spacers 11*b* are not arranged evenly at an equal pitch within the region of the angle portion frame region 55*a*, rather they are arranged in a concentrated manner close to the center of the corner portion of the cutout (close to the intersection of the straight line of the first sealing portion and the straight line of the second sealing portion). Put simply, the spacer arrangement density in the angle portion frame region 55*a* (second region) is higher in the central portion, decreasing closer toward the first normal line 116 or the second normal line 115.

It was indicated above that, in a liquid crystal panel, internal stress generated during processing of members and the panel production process remains within the glass substrate and the polarizing plate, but when the cutout is present in the outer peripheral shape, this stress is concentrated toward the corner portion of the cutout from both sides of the cutout, and there is likely to be an especially large variation in the cell gap 10 in the center of the corner portion of the cutout. Accordingly, the spacer arrangement density of the columnar spacers 11 near the center of the corner portion of the cutout in particular is also increased within the region of the angle portion frame region 55*a*, whereby variations in the cell gap 10 can be even more effectively restricted. It should be noted that the columnar spacers 11*b* are arranged in a concentrated manner near the center of the corner portion of the cutout within the region of the angle portion frame region 55*a*, but this concentration is not limited to the central portion, depending on the shape of the cutout, and the spacers should be arranged in the region where there is a large variation in the cell gap 10. Furthermore, there may be a plurality of regions within the angle portion frame region 55*a* where the columnar spacers 11*b* are arranged, depending on the shape of the cutout, in which case the columnar spacers 11 should be arranged so that the spacer arrangement density thereof decreases from the region in which the columnar spacers 11*b* are arranged toward the end of the angle portion frame region 55*a* in proximity thereto.

In Embodiments 5 and 6, the spacer arrangement density of the columnar spacers 11 indicates the sum of surface areas, in a plan view, of the columnar spacers 11 which are provided per unit surface area of the substrate surface where the spacers are arranged, as described above. Accordingly, even if the spacer arrangement densities are the same, it is also possible to provide fewer columnar spacers 11 having a larger surface area in plan view, i.e., to provide fewer columnar spacers 11 having a larger diameter when the spacers are cylindrical, or to provide a larger number of columnar spacers 11 having a smaller surface area in plan view, i.e., to provide a larger number of columnar spacers 11 having a narrower diameter when the spacers are cylindrical.

A liquid crystal panel may employ a dual spacer structure in order to further control variations in the cell gap 10. A dual spacer structure means a structure in which two types of columnar spacers 11 having different heights are provided, and, during a normal situation, main spacers having a greater height contact the array substrate 1 and the color filter substrate 2 so as to maintain the cell gap 10, while sub-spacers having a smaller height normally contact only either one of the array substrate 1 and the color filter substrate 2, without contributing to maintaining the cell gap 10, and the sub-spacers contact both the array substrate 1 and the color filter substrate 2 only when the cell gap 10 has narrowed to a given extent or more, then contributing to maintaining the cell gap 10. In Embodiments 5 and 6, the method of arrangement of the columnar spacers 11 of the present disclosure is used for the arrangement of the main spacers having a greater height in a liquid crystal panel employing the dual spacer structure, which thereby makes it possible to achieve an effect of restricting gap unevenness at the cutout. Furthermore, if the dual spacer structure is used within the region of the display region 4, and only the main spacers are arranged within the region of the frame region 5, the method of arrangement of the present disclosure may be used in relation to the arrangement of the main spacers.

Embodiment 7

In Embodiments 5 and 6, a description was given of the liquid crystal panel 101 in which gap unevenness at the corner portion of the cutout is restricted by increasing the spacer arrangement density in the angle portion frame region 55*a* in relation to the other regions. Embodiment 7 describes a mode in which the dummy seal 21 endowed with a spacer function is arranged in the angle portion frame region 55*a*, rather than the columnar spacers 11.

Figure 17:
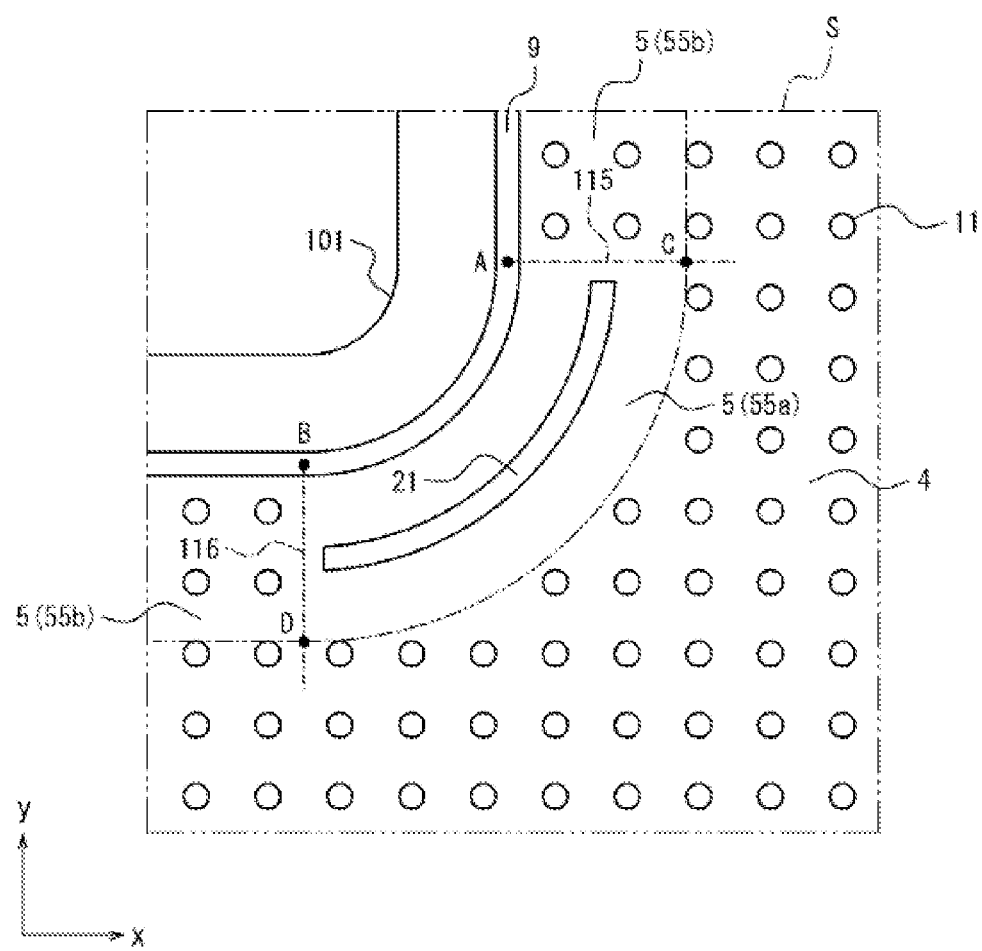
FIG. 17 is a plan view of a partial enlargement of a liquid crystal display device according to Embodiment 7 of the present invention.

FIG. 17 is a plan view showing the arrangement of the columnar spacers 11 and the dummy seal 21 within the region S in FIG. 12 according to Embodiment 7. In FIG. 17, the regions of the display region 4, the angle portion frame region 55*a*, and the linear portion frame regions 55*b* are set in the same way as illustrated in FIG. 14, and the columnar spacers 11 indicated by the circle in the same way as in Embodiment 5 are arranged in equal numbers per surface area at an equal pitch in the display region 4 and the linear portion frame regions 55*b*. In Embodiment 7, the dummy seal 21 formed at the same time as the seal 9 is further arranged only in the angle portion frame region 55*a*.

The dummy seal 21 is formed at the same time as the seal 9 and from the same material, and it also has the same height. However, the shape thereof, including the surface area and width, are not limited to what is illustrated in FIG. 17, and the shape should be set in accordance with the situation. Furthermore, a single dummy seal 21 is formed on its own in the linear portion frame regions 55*b* in FIG. 17, but this is not limiting, and a plurality of dummy seals 21 may be formed, or the dummy seal 21 may be arranged together with columnar spacers 11.

The seal 9 essentially forms a seal between the array substrate 1 and the color filter substrate 2 while surrounding the liquid crystals of the liquid crystal layer 3, but at the same time, it also has a spacer function for keeping the cell gap 10 in a fixed range. By arranging the dummy seal 21 having the same height as the seal 9 in the angle portion frame region 55*a*, as described in Embodiment 7, it is possible for the dummy seal 21 also to function as a spacer for maintaining the cell gap 10 at the cutout portion.

Embodiment 8

Embodiments 5 and 6 described a mode in which the spacer arrangement density in the angle portion frame region 55*a* is higher than in the linear portion frame regions 55*b*. Embodiment 8 describes a mode in which the spacer height in the angle portion frame region 55*a* is made greater than the spacer height in the linear portion frame regions 55*b*.

Figure 18:
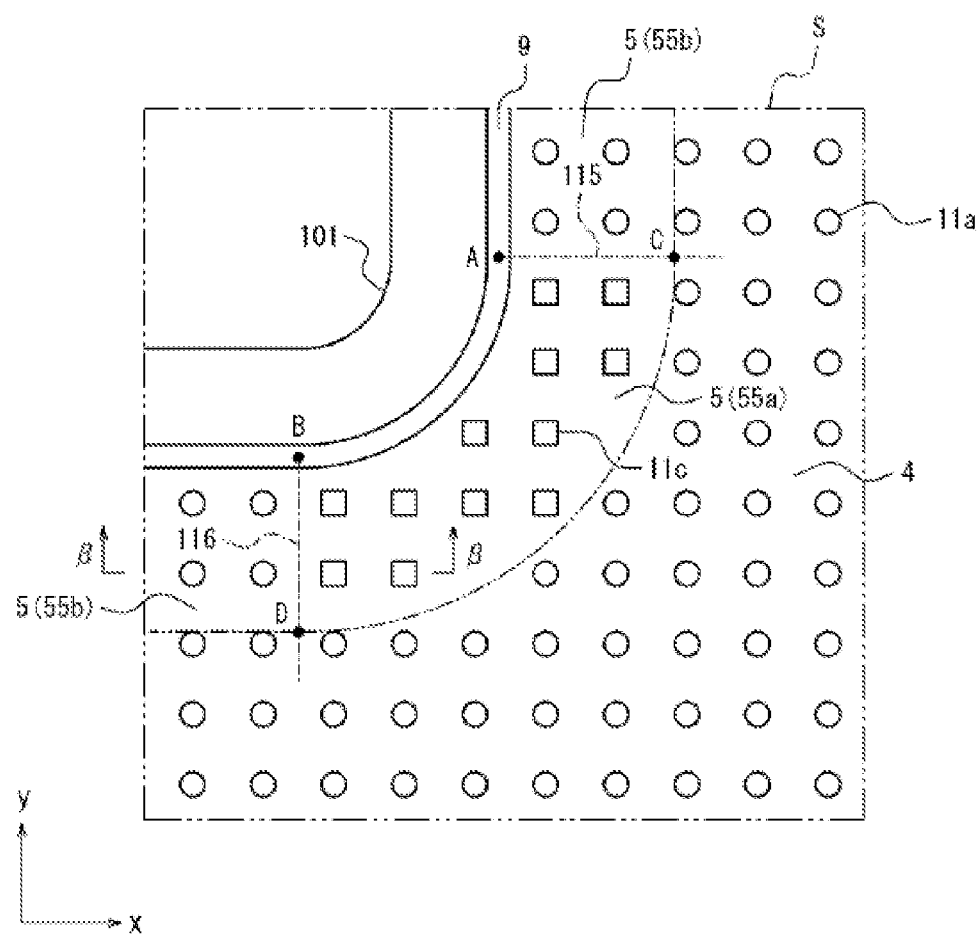
FIG. 18 is a plan view of a partial enlargement of a liquid crystal display device according to Embodiment 8 of the present invention.
Figure 19:
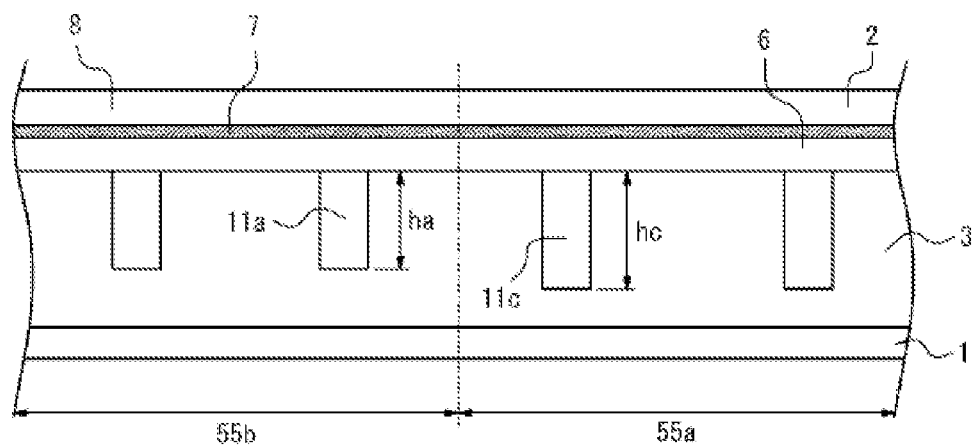
FIG. 19 is a view in cross section of the liquid crystal display device in FIG. 18.
Figure 20:
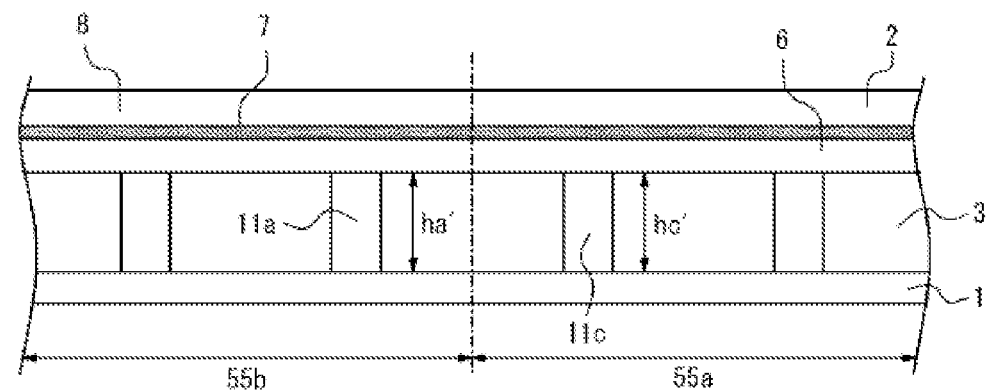
FIG. 20 is a view in cross section of the liquid crystal display device in FIG. 18.

FIG. 18 is a plan view showing the arrangement of the columnar spacers 11 within the region S of FIG. 12 in Embodiment 8, and FIGS. 19 and 20 are views in cross section showing the cross section β-β in FIG. 18. Furthermore, FIG. 19 shows the situation before the array substrate 1 and the color filter substrate 2 are bonded together, and FIG. 20 shows the situation after bonding. In FIG. 18, the regions of the display region 4, the angle portion frame region 55a, and the linear portion frame regions 55b are set in the same way as illustrated in FIG. 14, and the columnar spacers 11a indicated by the circle in the same way as in Embodiment 5 are arranged in equal numbers per surface area at an equal pitch in the display region 4 and the linear portion frame regions 55b. In Embodiment 8, the columnar spacers 11c of greater height and having the same cross-sectional area as the columnar spacers 11a are further arranged only in the angle portion frame region 55a. In FIG. 18, the columnar spacers 11c are indicated by a square, but this is only for ease of description, and the shape in plan view of the columnar spacers 11c is the same as that of the columnar spacers 11a. As shown in FIG. 19, the height hc of the columnar spacers 11c is greater than the height ha of the columnar spacers 11a (hc>ha), before the array substrate 1 and the color filter substrate 2 are bonded together. However, after the array substrate 1 and the color filter substrate 2 have been bonded together, the columnar spacers 11c are deformed and flattened to a greater extent than the columnar spacers 11a, as shown in FIG. 20, and they appear to have the same height as a result (hc'=ha'). By virtue of such a configuration, the columnar spacers 11c have greater resilience than the columnar spacers 11a for maintaining the cell gap 10 in a state in which the array substrate 1 and the color filter substrate 2 have been bonded together, and even if the angle portion frame region 55a is subjected to greater stress than the linear portion frame regions 55b, the columnar spacers 11c still demonstrate the function of maintaining the cell gap 10. The increased height of the columnar spacers 11c arranged in the angle portion frame region 55a in this way demonstrates the same effects as in Embodiment 5, where the spacer arrangement density of the columnar spacers 11 arranged in the angle portion frame region 55a is increased.

It should be noted that the columnar spacers 11c having a different height should be formed by using a half-tone mask, which has a gray color tone rather than black or white, as the mask which is employed for exposure in the process of forming the columnar spacers 11, for example.

Figure 21:
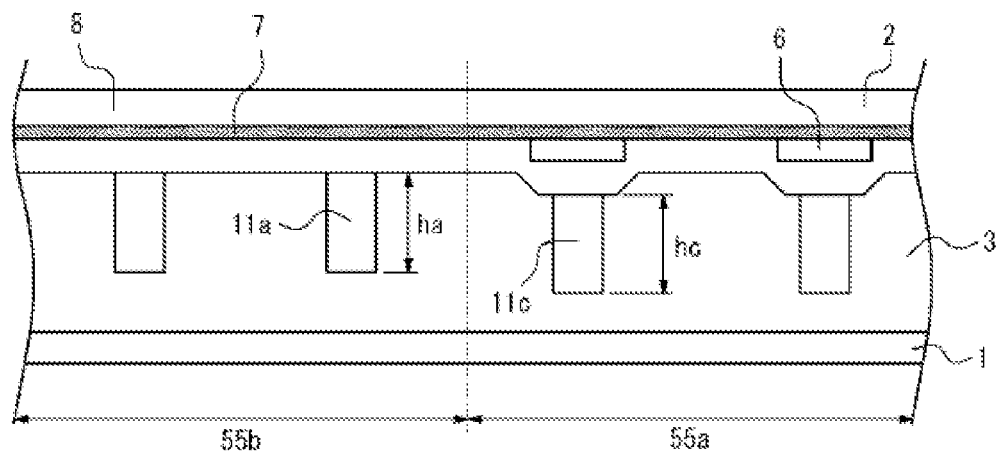
FIG. 21 is a view in cross section of the liquid crystal display device in FIG. 18.
Figure 22:
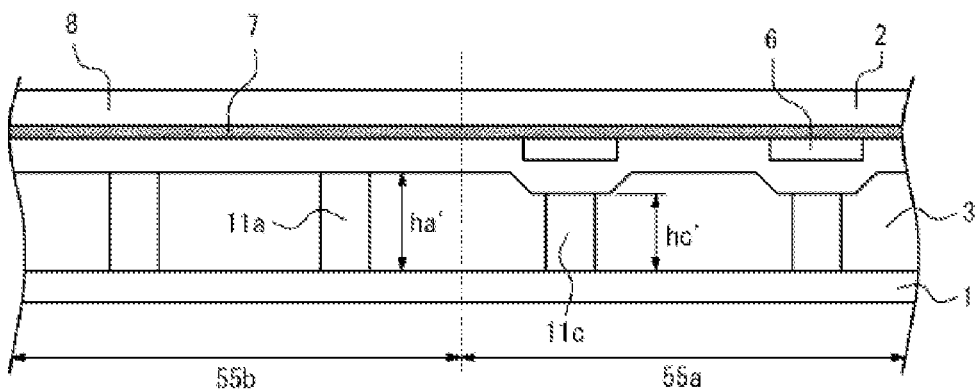
FIG. 22 is a view in cross section of the liquid crystal display device in FIG. 18.

As a different mode of Embodiment 8, a projection-shaped pattern may be provided on the surface of the color filter substrate 2 facing the liquid crystal layer 3, and the columnar spacers 11c may be arranged so as to overlap this pattern. FIGS. 21 and 22 are views in cross section showing the cross section β-β in FIG. 18. Furthermore, FIG. 21 shows the situation before the array substrate 1 and the color filter substrate 2 are bonded together, and FIG. 22 shows the situation after bonding. In this embodiment, as shown in FIG. 21, before the array substrate 1 and the color filter substrate 2 are bonded together, the heights of the actual columnar spacers 11 are the same for the columnar spacers 11a and the columnar spacers 11c (hc=ha), but a pattern in the colorant 6 is provided at the positions where the columnar spacers 11c are arranged. Accordingly, in a state in which the array substrate 1 and the color filter substrate 2 have been bonded together, the columnar spacers 11c are deformed and flattened to a greater extent than the columnar spacers 11a in proportion to the thickness of the pattern in the colorant 6 (hc'<ha'), as shown in FIG. 22, and the effect demonstrated is the same as that when the height of the actual columnar spacers 11c is increased. This mode may be realized by also forming the pattern in the colorant 6 at the positions in the linear portion frame regions 55b where the columnar spacers 11 are arranged, in the process of forming the colorant 6 in the display region 4 of the color filter substrate 2, for example. Alternatively, the pattern may be formed by a photocurable overcoat.

Moreover, the same effect is also demonstrated when the projection-shaped pattern is provided on the surface of the array substrate 1 facing the liquid crystal layer 3, and the columnar spacers 11c are arranged so as to overlap the pattern. This mode may be realized by forming an insulating film pattern for insulating gate wiring and source wiring of the array substrate 1 only at the positions in the angle portion frame region 55a where the columnar spacers 11c are arranged.

The increased height of the columnar spacers 11 within certain regions as described in Embodiment 8 demonstrates the same effects as with the increased spacer arrangement density of the columnar spacers 11 described in Embodiments 5 and 6. Accordingly, the mode in which the spacer arrangement density of the columnar spacers 11 is varied in the display region 4, the angle portion frame region 55a, and the linear portion frame regions 55b described in Embodiment 5 also demonstrates the same effects as the mode in which columnar spacers 11 with different heights of the columnar spacers 11 are provided. Furthermore, the mode in which the spacer arrangement density of the columnar spacers 11 is varied within the region of the angle portion frame region 55a, as in Embodiment 6, also demonstrates the same effects as the mode in which columnar spacers 11 with different heights of the columnar spacers 11 are provided.

It should be noted that Embodiments 1-8 described the liquid crystal panel 101 having an FFS drive system, but the system for driving the liquid crystals is not limited to an FFS system, and the same effects are also demonstrated with another system such as a TN (twisted nematic) system or an in-plane switching system.

Furthermore, modes in which the columnar spacers 11 are arranged on the color filter substrate 2 were described, but the same effects are also demonstrated if the columnar spacers 11 are arranged on the array substrate 1.

KEY TO SYMBOLS

101 . . . Liquid crystal panel
1 . . . Array substrate
2 . . . Color filter substrate
3 . . . Liquid crystal layer
4 . . . Display region
4a . . . Outer peripheral line of display region
5, 5a, 5b . . . Frame region
6 . . . Colorant
7 . . . Black matrix
8 . . . Overcoat film
9 . . . Seal
9a, 9c . . . Seal linear portion
9b . . . Seal curved portion
10 . . . Cell gap
11, 11a, 11b, 11c . . . Columnar spacer
15, 16 . . . Normal line
21 . . . Dummy seal
55a . . . Angle portion frame region
55b . . . Linear portion frame region
99a . . . Second seal linear portion
99b . . . Third seal curved portion
99c . . . First seal linear portion 115 . . . Second normal line
116 . . . First normal line

The invention claimed is:

1. A liquid crystal display device comprising:
a first substrate;
a second substrate arranged facing the first substrate;
a liquid crystal layer interposed between the first substrate and the second substrate;
a seal which is arranged between the first substrate and the second substrate so as to surround the liquid crystal layer, the seal having a curved indent in an outer peripheral shape thereof; and
first spacers which are provided on a surface of the first substrate facing the liquid crystal layer and maintain an interval between the first substrate and the second substrate,
characterized in that, when: a region corresponding to the liquid crystal layer for displaying an image constitutes a first region,
a region corresponding to the liquid crystal layer and surrounded by the curved indent of the seal, the outer periphery of the first region, a first normal line extending downward from a start point of the curved indent of the seal to the outer periphery of the first region, and a second normal line extending downward from an end point of the curved indent of the seal to the outer periphery of the first region constitutes a second region, and
a region corresponding to the liquid crystal layer other than the first region and other than the second region constitutes a third region,
in a plan view, a surface area occupied by the first spacers per unit surface area of the second region is greater than a surface area occupied by the first spacers per unit surface area of the third region.

2. The liquid crystal display device as claimed in claim 1, characterized in that, in a plan view, the surface area occupied by the first spacers per unit surface area of the second region becomes smaller approaching the first normal line or the second normal line.

3. The liquid crystal display device as claimed in claim 1, characterized in that, in a plan view, the surface area occupied by the first spacers per unit surface area of the third region is smaller than the surface area occupied by the first spacers per unit surface area of a region where the surface area occupied by the first spacers per unit surface area of the second region is smallest.

4. The liquid crystal display device as claimed in claim 1, characterized in that, in a plan view, the surface area occupied by the first spacers per unit surface area of the third region is the same as or greater than the surface area occupied by the first spacers per unit surface area of the first region.

5. The liquid crystal display device as claimed in claim 1, characterized by comprising second spacers having a smaller height than the first spacers.

6. The liquid crystal display device as claimed in claim 1, characterized in that the first spacers are a dummy seal formed from the same material as the seal.

7. A liquid crystal display device comprising:
a first substrate;
a second substrate arranged facing the first substrate;
a liquid crystal layer interposed between the first substrate and the second substrate;
a seal which is arranged between the first substrate and the second substrate so as to surround the liquid crystal layer, the seal having a curved indent in an outer peripheral shape thereof; and
first spacers which are provided on a surface of the first substrate facing the liquid crystal layer, characterized in that, when: a region corresponding to the liquid crystal layer for displaying an image constitutes a first region,
a region corresponding to the liquid crystal layer and surrounded by the curved indent of the seal, the outer periphery of the first region, a first normal line extending downward from a start point of the curved indent of the seal to the outer periphery of the first region, and a second normal line extending downward from an end point of the curved indent of the seal to the outer periphery of the first region constitutes a second region, and
a region corresponding to the liquid crystal layer other than the first region and other than the second region constitutes a third region,
the height of the first spacers in the second region is greater than the height of the first spacers in the third region, before the second substrate is arranged facing the first substrate.

8. The liquid crystal display device as claimed in claim 7, characterized in that the height of the first spacers within the second region decreases approaching the first normal line or the second normal line, before the second substrate is arranged facing the first substrate.

9. The liquid crystal display device as claimed in claim 7, characterized in that the height of the first spacers of greatest height within the third region is lower than the height of the first spacers of smallest height within the second region, before the second substrate is arranged facing the first substrate.

10. The liquid crystal display device as claimed in claim 7, characterized in that the height of the first spacers in the third region is the same as or greater than the height of the first spacers in the first region, before the second substrate is arranged facing the first substrate.

11. A liquid crystal display device comprising:
a first substrate;
a second substrate arranged facing the first substrate;
a liquid crystal layer interposed between the first substrate and the second substrate;
a seal which is arranged between the first substrate and the second substrate so as to surround the liquid crystal layer; and
spacers which are provided between the first substrate and the second substrate and maintain an interval between the first substrate and the second substrate,
characterized in that the seal includes: a first sealing portion extending in a first direction, a second sealing portion extending in a second direction different from the first direction, and a third sealing portion smoothly joining the first sealing portion and the second sealing portion, and
when: a region for displaying an image constitutes a first region,
a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and a region other than the first region and other than the second region constitutes a third region, a spacer arrangement density, which is a proportion of the surface area occupied by the spacers per unit surface area in a plan view, is greater in the second region than in the third region.

12. The liquid crystal display device as claimed in claim 11, characterized in that the spacer arrangement density in the second region becomes smaller approaching the first normal line or the second normal line.

13. The liquid crystal display device as claimed in claim 11, characterized in that the spacer arrangement density in the third region is equal to or less than the minimum value of the spacer arrangement density in the second region.

14. The liquid crystal display device as claimed in claim 11, characterized in that the spacer arrangement density in the third region is equal to or greater than the spacer arrangement density in the first region.

15. The liquid crystal display device as claimed in claim 11, characterized in that the spacers include first spacers and second spacers having a smaller height than the first spacers.

16. The liquid crystal display device as claimed in claim 11, characterized in that the spacers in the second region are a dummy seal formed from the same material as the seal.

17. A liquid crystal display device comprising:
a first substrate;
a second substrate arranged facing the first substrate;
a liquid crystal layer interposed between the first substrate and the second substrate;
a seal which is arranged between the first substrate and the second substrate so as to surround the liquid crystal layer; and
spacers provided on a surface of the first substrate facing the liquid crystal layer,
characterized in that the seal includes: a first sealing portion extending in a first direction, a second sealing portion extending in a second direction different from the first direction, and a third sealing portion smoothly joining the first sealing portion and the second sealing portion, and when: a region for displaying an image constitutes a first region,
a region surrounded by the third sealing portion, the outer periphery of the first region, a first normal line extending downward from a boundary point between the first sealing portion and the third sealing portion to the outer periphery of the first region, and a second normal line extending downward from a boundary point between the second sealing portion and the third sealing portion to the outer periphery of the first region constitutes a second region, and
a region other than the first region and other than the second region constitutes a third region, the height of at least one of the spacers in the second region is greater than the height of the spacers in the third region, before the second substrate is arranged facing the first substrate.

18. The liquid crystal display device as claimed in claim 17, characterized in that the height of the spacers within the second region decreases approaching the first normal line or the second normal line, before the second substrate is arranged facing the first substrate.

19. The liquid crystal display device as claimed in claim 17, characterized in that the height of the spacers of smallest height within the second region is equal to or greater than the height of the spacers of greatest height within the third region, before the second substrate is arranged facing the first substrate.

20. The liquid crystal display device as claimed in claim 17, characterized in that the height of the spacers in the third region is the same as or greater than the height of first spacers in the first region, before the second substrate is arranged facing the first substrate.

* * * * *